(12) United States Patent
Amini et al.

(10) Patent No.: US 8,958,398 B2
(45) Date of Patent: Feb. 17, 2015

(54) TIME DIVISION MULTIPLE ACCESS (TDMA) MEDIA ACCESS CONTROL (MAC) ADAPTED FOR SINGLE USER, MULTIPLE USER, MULTIPLE ACCESS, AND/OR MIMO WIRELESS COMMUNICATIONS

(75) Inventors: Peiman Amini, Mountain View, CA (US); Matthew James Fischer, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 296 days.

(21) Appl. No.: 13/539,186

(22) Filed: Jun. 29, 2012

(65) Prior Publication Data

US 2013/0077608 A1    Mar. 28, 2013

Related U.S. Application Data

(60) Provisional application No. 61/539,352, filed on Sep. 26, 2011, provisional application No. 61/539,357, filed on Sep. 26, 2011.

(51) Int. Cl.
*H04W 74/04*    (2009.01)
*H04L 1/00*    (2006.01)
*H04L 1/06*    (2006.01)

(52) U.S. Cl.
CPC .......... *H04L 1/0065* (2013.01); *H04L 1/0041* (2013.01); *H04L 1/0003* (2013.01); *H04L 1/0009* (2013.01); *H04L 1/0618* (2013.01); *Y02B 60/50* (2013.01)
USPC ........ 370/337; 370/347; 370/352; 455/343.2; 455/343.5

(58) Field of Classification Search
CPC .......................... H04W 52/0219; H04L 67/12

USPC ................................ 370/337, 347, 310, 352; 455/343.2–343.5
See application file for complete search history.

(56) References Cited

U.S. PATENT DOCUMENTS

| 2001/0055297 A1 | 12/2001 | Benveniste |
| 2007/0053470 A1 | 3/2007 | Yousef et al. |

(Continued)

FOREIGN PATENT DOCUMENTS

| CN | 101009617 A | 8/2007 |
| CN | 101366247 A | 2/2009 |

*Primary Examiner* — Un C Cho
*Assistant Examiner* — Romani Ohri
(74) *Attorney, Agent, or Firm* — Garlick & Markison; Shayne X. Short

(57) ABSTRACT

Time division multiple access (TDMA) media access control (MAC) adapted for single user, multiple user, multiple access, and/or MIMO wireless communications. Various com systems may include smart meter stations (SMSTAs) and/or wireless stations (STAs). Appropriate coordination is made with respect to such communication devices to ensure appropriate uplink (and/or downlink) communications between a network manager or coordinator (e.g., an access point (AP)) and the SMSTAs and/or STAs. With respect to SMSTAs, the relative duration of time that such communication devices are awake and operative versus asleep (or in a reduced power and/or functionality state) can be significant. Certain implementations may include a relatively large number of such communication devices (e.g., 10s, 100a, 1000s, or more), and appropriate coordination and scheduling of such communications to/from them is made using one or more variations of TDMA signaling (e.g., including different respective service periods (SPs), communication medium access operational modes, adaptation thereof, etc.).

20 Claims, 28 Drawing Sheets

(56) References Cited

U.S. PATENT DOCUMENTS

2007/0299956 A1* 12/2007 Odaka et al. .................. 709/223
2010/0026479 A1 2/2010 Tran
2010/0315979 A1* 12/2010 Surineni et al. ............... 370/310

* cited by examiner

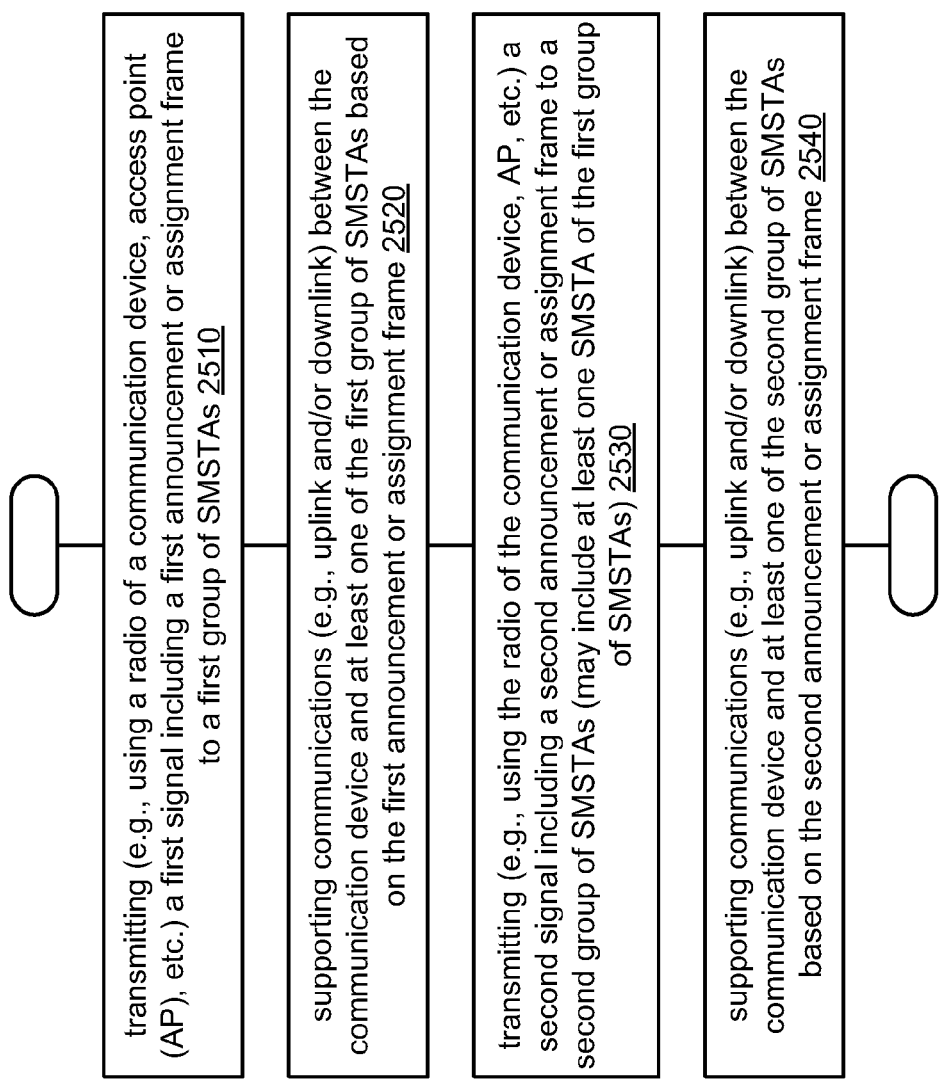

2600 transmitting (e.g., using a radio of a communication device, AP, etc.) a signal including a first announcement or assignment frame indicating a number of service periods (SPs) to a group of SMSTAs 2610 during a first SP, supporting communications (e.g., uplink and/or downlink) between the communication device and a first at least one of the SMSTAs 2620 during a second SP, supporting communications (e.g., uplink and/or downlink) between the communication device and a second at least one SMSTA (may include at least one SMSTA operative during the first SP) 2630

during an n-th SP, supporting communications (e.g., uplink and/or downlink) between the communication device and an n-th at least one SMSTA (may include at least one SMSTA operative during the first and/or second SP) 2640

FIG. 26

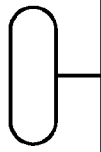

2700 transmitting (e.g., using a radio of a communication device, AP, etc.) a signal including a first announcement or assignment frame indicating a number of service periods (SPs) to a group of SMSTAs 2710 during a first SP, a first at least one of the SMSTAs making communication media access in accordance with a first operational mode for supporting communications with the communication device (e.g., uplink and/or downlink) 2720 during a second SP, a second at least one of the SMSTAs making communication media access in accordance with a second operational mode (and/or or the first or second operational mode) for supporting communications with the communication device (e.g., uplink and/or downlink) 2730

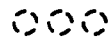

during an n-th SP, an n-th at least one of the SMSTAs making communication media access in accordance with an n-th operational mode (and/or or the first or second operational mode) for supporting communications with the communication device (e.g., uplink and/or downlink) 2740

FIG. 27

TIME DIVISION MULTIPLE ACCESS (TDMA) MEDIA ACCESS CONTROL (MAC) ADAPTED FOR SINGLE USER, MULTIPLE USER, MULTIPLE ACCESS, AND/OR MIMO WIRELESS COMMUNICATIONS

CROSS REFERENCE TO RELATED PATENTS/PATENT APPLICATIONS

Provisional Priority claims

The present U.S. Utility patent application claims priority pursuant to 35 U.S.C. §119(e) to the following U.S. Provisional patent applications which are hereby incorporated herein by reference in their entirety and made part of the present U.S. Utility patent application for all purposes:

1. U.S. Provisional Patent Application Ser. No. 61/539,352, entitled "Time division multiple access (TDMA) media access control (MAC) adapted for single user, multiple user, multiple access, and/or MIMO wireless communications,", filed Sep. 26, 2011, pending.

2. U.S. Provisional Patent Application Ser. No. 61/539,357, entitled "Smart meter media access control (MAC) for single user, multiple user, multiple access, and/or MIMO wireless communications,", filed Sep. 26, 2011, pending.

INCORPORATION BY REFERENCE

The following U.S. Utility patent application are hereby incorporated herein by reference in their entirety and made part of the present U.S. Utility patent application for all purposes:

1. U.S. Utility Patent Application Ser. No. 13/539,194, entitled "Smart meter media access control (MAC) for single user, multiple user, multiple access, and/or MIMO wireless communications,"filed concurrently on 06-29-2012, pending, which also claims priority pursuant to 35 U.S.C. §119(e) to the following U.S. Provisional Patent Applications which are hereby incorporated herein by reference in their entirety and made part of the present U.S. Utility Patent Application for all purposes:

1.1. U.S. Provisional Patent Application Ser. No. 61/539,352, entitled "Time division multiple access (TDMA) media access control (MAC) adapted for single user, multiple user, multiple access, and/or MIMO wireless communications,", filed Sep. 26, 2011, pending.
   1.2. U.S. Provisional Patent Application Ser. No. 61/539,357, entitled "Smart meter media access control (MAC) for single user, multiple user, multiple access, and/or MIMO wireless communications,", filed Sep. 26, 2011, pending 2. U.S. Utility patent application Ser. No. 12/796,655, entitled "Group identification and definition within multiple user, multiple access, and/or MIMO wireless communications,", filed on Jun. 8, 2010, pending.

INCORPORATION BY REFERENCE

The following IEEE standards/draft standards are hereby incorporated herein by reference in their entirety and are made part of the present U.S. Utility patent application for all purposes:

1. IEEE Std 802.11™—2012, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Computer Society, Sponsored by the LAN/MAN Standards Committee, IEEE Std 802.11™—2012, (Revision of IEEE Std 802.11—2007), 2793 total pages (incl. pp. i-xcvi, 1-2695).

2. IEEE Std 802.11n™—2009, "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Computer Society, IEEE Std 802.11n™—2009, (Amendment to IEEE Std 802.11™—2007 as amended by IEEE Std 802.11k™—2008, IEEE Std 802.11r™—2008, IEEE Std 802.11y™—2008, and IEEE Std 802.11r™—2009), 536 total pages (incl. pp. i-xxxii, 1-502).

3. IEEE Draft P802.11—REVmb™/D12, November 2011 (Revision of IEEE Std 802.11™—2007 as amended by IEEE Std 802.11k™—2008, IEEE Std 802.11r™—2008, IEEE Std 802.11y™—2008, IEEE Std 802.11w™—2009, IEEE Std 802.11n™—2009, IEEE Std 802.11p™—2010, IEEE Std 802.11z™—2010, IEEE Std 802.11v™—2011, IEEE Std 802.11u™—2011, and IEEE Std 802.11s™—2011), "IEEE Standard for Information technology—Telecommunications and information exchange between systems—Local and metropolitan area networks—Specific requirements; Part 11: Wireless LAN Medium Access Control (MAC) and Physical Layer (PHY) Specifications," Prepared by the 802.11 Working Group of the LAN/MAN Standards Committee of the IEEE Computer Society, 2910 total pages (incl. pp. i-cxxviii, 1-2782).

4. IEEE P802.11ac™/D2.1, March 2012, "Draft STANDARD for Information Technology—Telecommunications and information exchange between systems—Local and metropolitan area networks—Specific requirements, Part 11: Wireless LAN Medium Access Control (MAC) and Physical Layer (PHY) specifications, Amendment 4: Enhancements for Very High Throughput for Operation in Bands below 6 GHz," Prepared by the 802.11 Working Group of the 802 Committee, 363 total pages (incl. pp. i-xxv, 1-338).

5. IEEE P802.11ad™/D6.0, March 2012, (Draft Amendment based on IEEE P802.11REVmb D12.0), (Amendment to IEEE P802.11REVmb D12.0 as amended by IEEE 802.11ae D8.0 and IEEE 802.11aa D9.0), "IEEE P802.11ad™/D6.0 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band," Sponsor: IEEE 802.11 Committee of the IEEE Computer Society, IEEE-SA Standards Board, 664 total pages.

6. IEEE Std 802.11ae™—2012, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," "Amendment 1: Prioritization of Management Frames," IEEE Computer Society, Sponsored by the LAN/MAN Standards Committee, IEEE Std 802.11ae™—2012, (Amendment to IEEE Std 802.11™—2012), 52 total pages (incl. pp. i-xii, 1-38).

7. IEEE P802.11af™/D1.06, March 2012, (Amendment to IEEE Std 802.11REVmb™/D12.0 as amended by IEEE Std 802.11ae™/D8.0, IEEE Std 802.11aa™/D9.0, IEEE Std 802.11ad™/D5.0, and IEEE Std 802.11ac™/D2.0), "Draft Standard for Information Technology—Telecommunications and information exchange between systems—Local and metropolitan area networks—Specific requirements—Part 11: Wireless LAN Medium Access Control (MAC) and Physical Layer (PHY) Specifications—Amendment 5: TV White Spaces Operation," Prepared by the 802.11 Working Group of the IEEE 802 Committee, 140 total pages (incl. pp. i-xxii, 1-118).

BACKGROUND OF THE INVENTION

1. Technical Field of the Invention

The invention relates generally to communication systems; and, more particularly, it relates to coordination and operation of multiple wireless communication devices within single user, multiple user, multiple access, and/or MIMO wireless communications.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies them. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennae (alternatively, antennas), of a receiver. When the receiver includes two or more antennae, the receiver will select one of them to receive the incoming RF signals. In this instance, the wireless communication between the transmitter and receiver is a single-output-single-input (SISO) communication, even if the receiver includes multiple antennae that are used as diversity antennae (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennae and two or more receiver paths. Each of the antennae receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennae to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), it would be desirable to use one or more types of wireless communications to enhance data throughput within a WLAN. For example, high data rates can be achieved with MIMO communications in comparison to SISO communications. However, most WLAN include legacy wireless communication devices (i.e., devices that are compliant with an older version of a wireless communication standard). As such, a transmitter capable of MIMO wireless communications should also be backward compatible with legacy devices to function in a majority of existing WLANs.

Therefore, a need exists for a WLAN device that is capable of high data throughput and is backward compatible with legacy devices.

BRIEF DESCRIPTION OF THE SEVERAL VIEWS OF THE DRAWINGS

FIG. 24, FIG. 25, FIG. 26, FIG. 27, and FIG. 28 illustrate various embodiments of methods performed by one or more communication devices.

DETAILED DESCRIPTION OF THE INVENTION

Figure 1:
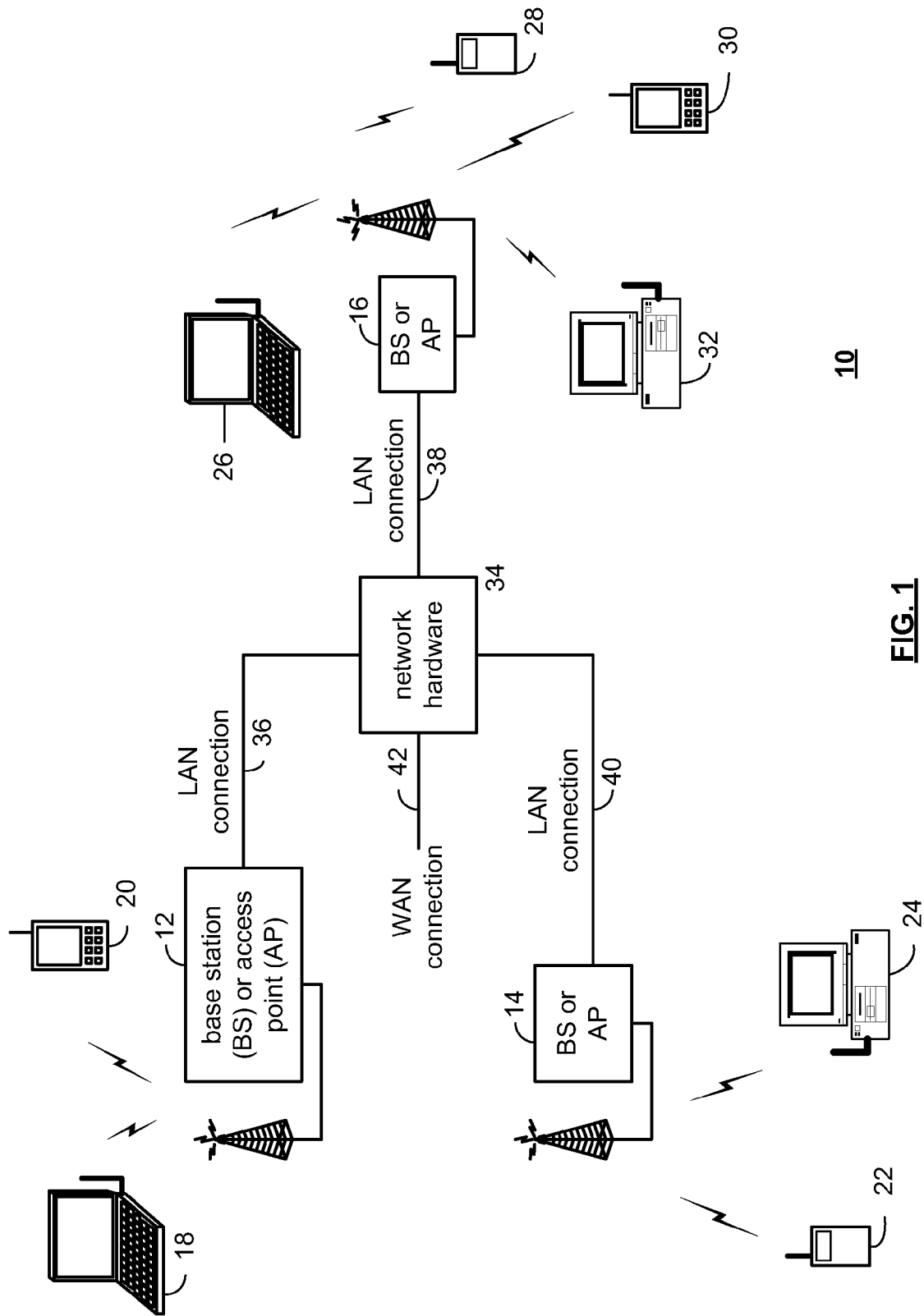
FIG. 1 is a diagram illustrating an embodiment of a wireless communication system.

FIG. 1 is a diagram illustrating an embodiment of a wireless communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of an embodiment of such wireless communication devices are described in greater detail with reference to FIG. 2.

The base stations (BSs) or access points (APs) 12-16 are operably coupled to the network hardware 34 via local area network connections 36, 38 and 40. The network hardware 34, which may be a router, switch, bridge, modem, system controller, etc., provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio. Such wireless communication devices may operate in accordance with the various aspects of the invention as presented herein to enhance performance, reduce costs, reduce size, and/or enhance broadband applications.

Figure 2:
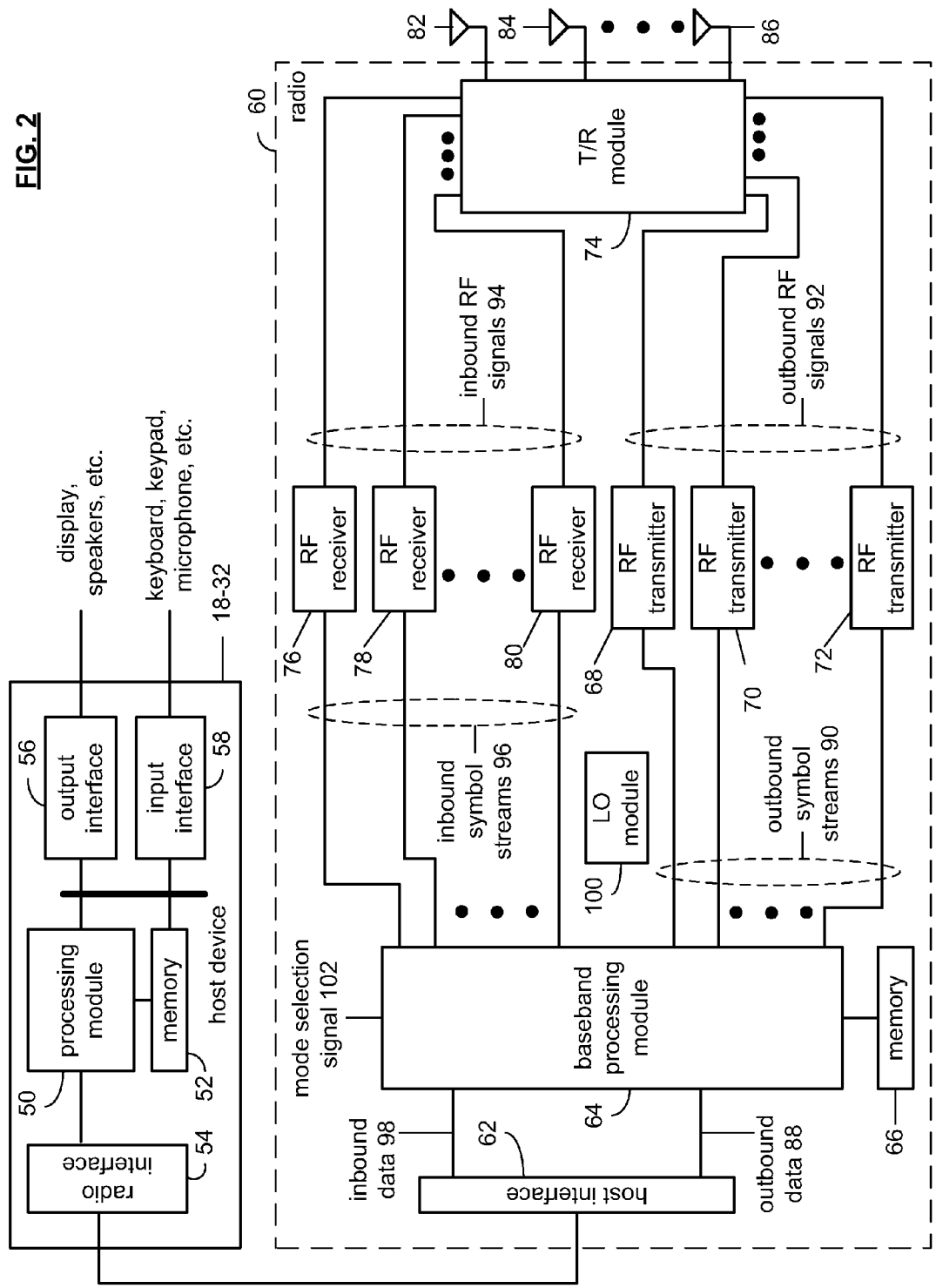
FIG. 2 is a diagram illustrating an embodiment of a wireless communication device.

FIG. 2 is a diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc. such that the received data may be displayed. The radio interface 54 also provides data from the processing module 50 to the radio 60. The processing module 50 may receive the outbound data from an input device such as a keyboard, keypad, microphone, etc. via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennae 82-86, a plurality of RF receivers 76-80, and a local oscillation module 100. The baseband processing module 64, in combination with operational instructions stored in memory 66, execute digital receiver functions and digital transmitter functions, respectively. The digital receiver functions, as will be described in greater detail with reference to FIG. 11B, include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables, which appear at the end of the detailed discussion. For example, the mode selection signal 102, with reference to table 1 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per subcarrier (NBPSC), coded bits per OFDM symbol (NCBPS), data bits per OFDM symbol (NDBPS).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabits-per-second. If this is the particular mode select, the channelization is illustrated in table 5. As a further alternative, the mode select signal 102 may indicate a 2.4 GHz frequency band, 20 MHz channels and a maximum bit rate of 192 megabits-per-second as illustrated in table 6. In table 6, a number of antennae may be utilized to achieve the higher bit rates. In this instance, the mode select would further indicate the number of antennae to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. The corresponding table 8 includes various bit rates ranging from 12 megabits-per-second to 216 megabits-per-second utilizing 2-4 antennae and a spatial time encoding rate as indicated. Table 9 illustrates the channelization for table 8. The mode select signal 102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1-4 antennae and a corresponding spatial time code rate. Table 10 further illustrates a particular modulation scheme code rate and NBPSC values. Table 11 provides the power spectral density mask for table 10 and table 12 provides the channelization for table 10.

It is of course noted that other types of channels, having different bandwidths, may be employed in other embodiments without departing from the scope and spirit of the invention. For example, various other channels such as those having 80 MHz, 120 MHz, and/or 160 MHz of bandwidth may alternatively be employed such as in accordance with IEEE Task Group ac (TGac VHTL6).

The baseband processing module 64, based on the mode selection signal 102 produces the one or more outbound symbol streams 90, as will be further described with reference to FIGS. 5-9 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennae, the baseband processing module 64 will produce 2, 3 or 4 outbound symbol streams 90 corresponding to the number of antennae from the output data 88.

Depending on the number of outbound streams 90 produced by the baseband module 64, a corresponding number of the RF transmitters 68-72 will be enabled to convert the outbound symbol streams 90 into outbound RF signals 92. The implementation of the RF transmitters 68-72 will be further described with reference to FIG. 3. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennae 82-86. The T/R module 74 provides the inbound RF signals 94 to one or more RF receivers 76-80. The RF receiver 76-80, which will be described in greater detail with reference to FIG. 4, converts the inbound RF signals 94 into a corresponding number of inbound symbol streams 96. The number of inbound symbol streams 96 will correspond to the particular mode in which the data was received (recall that the mode may be any one of the modes illustrated in tables 1-12). The baseband processing module 64 receives the inbound symbol streams 90 and converts them into inbound data 98, which is provided to the host device 18-32 via the host interface 62.

In one embodiment of radio 60 it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 64, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module, which will be described in greater detail with reference to FIGS. 10A and 10B, includes an error protection module, a demultiplexing module, and a plurality of direction conversion modules. The error protection module, which may be implemented in the processing module 64, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams The plurality of direct conversion modules is operably coupled to convert the plurality of error protected data streams into a plurality of radio frequency (RF) signals.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennae 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
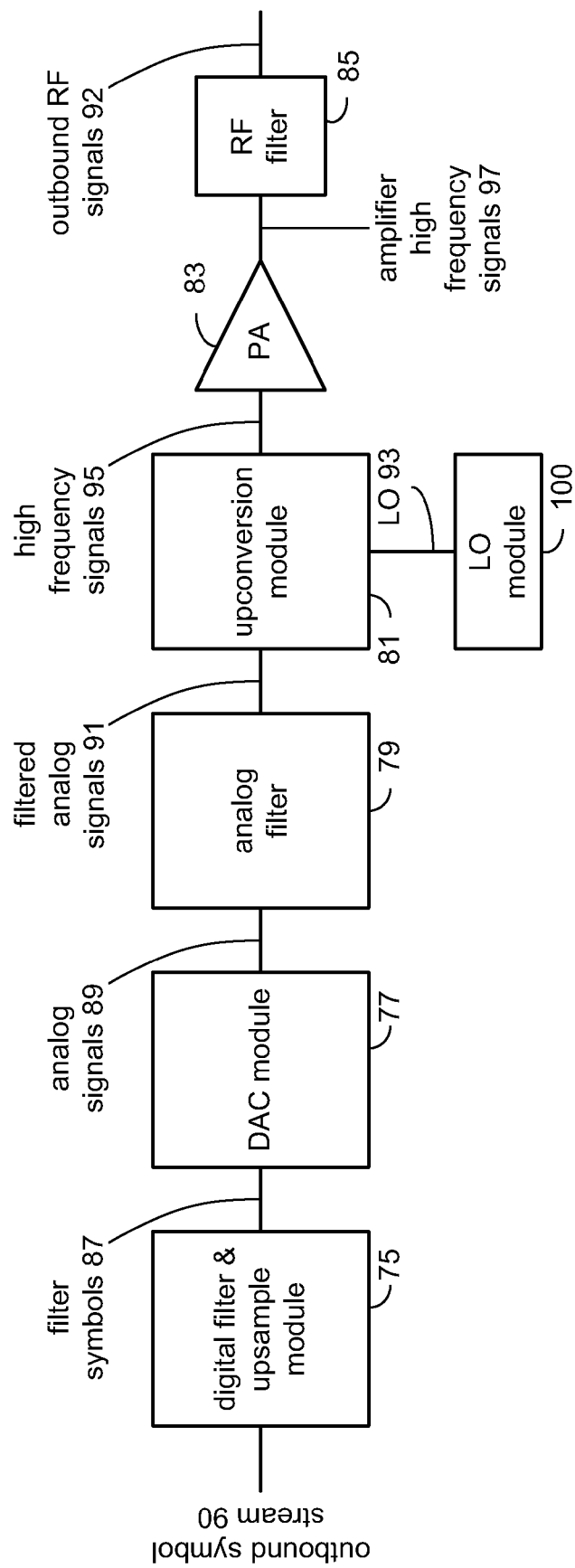
FIG. 3 is a diagram illustrating an embodiment of a radio frequency (RF) transmitter.

FIG. 3 is a diagram illustrating an embodiment of a radio frequency (RF) transmitter 68-72, or RF front-end, of the WLAN transmitter. The RF transmitter 68-72 includes a digital filter and up-sampling module 75, a digital-to-analog conversion module 77, an analog filter 79, and up-conversion module 81, a power amplifier 83 and a RF filter 85. The digital filter and up-sampling module 75 receives one of the outbound symbol streams 90 and digitally filters it and then up-samples the rate of the symbol streams to a desired rate to produce the filtered symbol streams 87. The digital-to-analog conversion module 77 converts the filtered symbols 87 into analog signals 89. The analog signals may include an in-phase component and a quadrature component.

The analog filter 79 filters the analog signals 89 to produce filtered analog signals 91. The up-conversion module 81, which may include a pair of mixers and a filter, mixes the filtered analog signals 91 with a local oscillation 93, which is produced by local oscillation module 100, to produce high frequency signals 95. The frequency of the high frequency signals 95 corresponds to the frequency of the outbound RF signals 92.

The power amplifier 83 amplifies the high frequency signals 95 to produce amplified high frequency signals 97. The RF filter 85, which may be a high frequency band-pass filter, filters the amplified high frequency signals 97 to produce the desired output RF signals 92.

As one of average skill in the art will appreciate, each of the radio frequency transmitters 68-72 will include a similar architecture as illustrated in FIG. 3 and further include a shut-down mechanism such that when the particular radio frequency transmitter is not required, it is disabled in such a manner that it does not produce interfering signals and/or noise.

Figure 4:
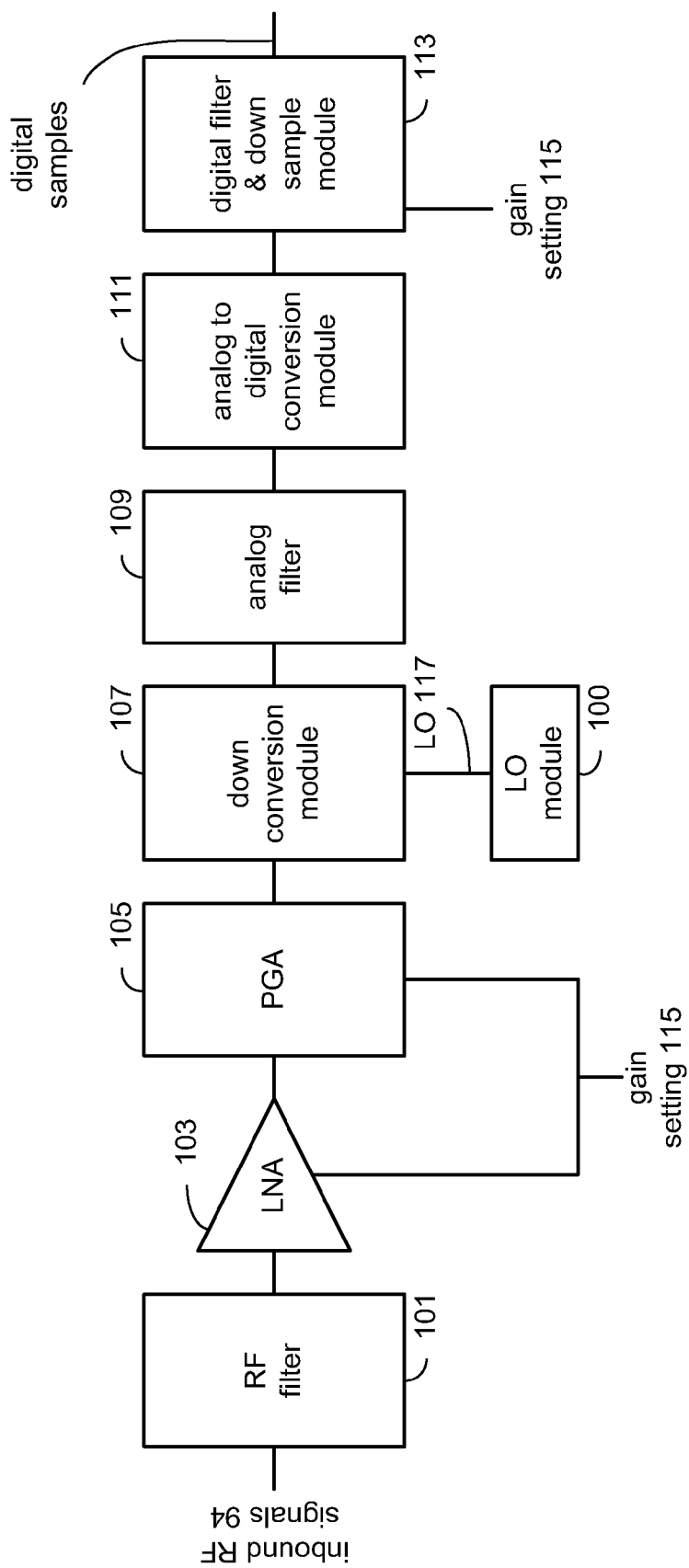
FIG. 4 is a diagram illustrating an embodiment of an RF receiver.

FIG. 4 is a diagram illustrating an embodiment of an RF receiver. This may depict any one of the RF receivers 76-80. In this embodiment, each of the RF receivers 76-80 includes an RF filter 101, a low noise amplifier (LNA) 103, a programmable gain amplifier (PGA) 105, a down-conversion module 107, an analog filter 109, an analog-to-digital conversion module 111 and a digital filter and down-sampling module 113. The RF filter 101, which may be a high frequency band-pass filter, receives the inbound RF signals 94 and filters them to produce filtered inbound RF signals. The low noise amplifier 103 amplifies the filtered inbound RF signals 94 based on a gain setting and provides the amplified signals to the programmable gain amplifier 105. The programmable gain amplifier further amplifies the inbound RF signals 94 before providing them to the down-conversion module 107.

The down-conversion module 107 includes a pair of mixers, a summation module, and a filter to mix the inbound RF signals with a local oscillation (LO) that is provided by the local oscillation module to produce analog baseband signals. The analog filter 109 filters the analog baseband signals and provides them to the analog-to-digital conversion module 111 which converts them into a digital signal. The digital filter and down-sampling module 113 filters the digital signals and then adjusts the sampling rate to produce the digital samples (corresponding to the inbound symbol streams 96).

Figure 5:
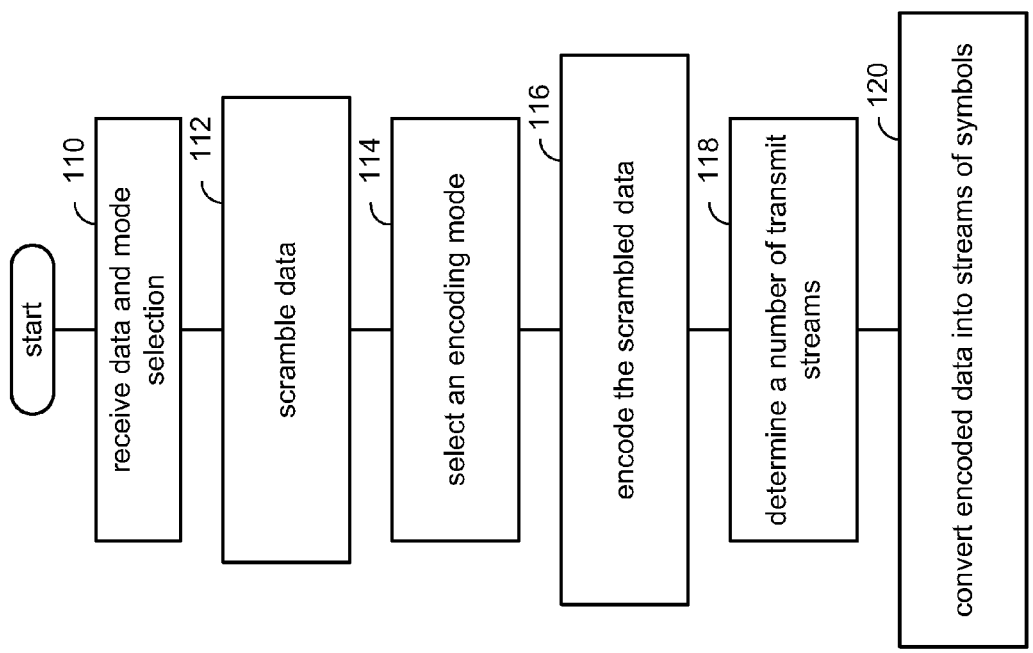
FIG. 5 is a diagram illustrating an embodiment of a method for baseband processing of data.

FIG. 5 is a diagram illustrating an embodiment of a method for baseband processing of data. This diagram shows a method for converting outbound data 88 into one or more outbound symbol streams 90 by the baseband processing module 64. The process begins at Step 110 where the baseband processing module receives the outbound data 88 and a mode selection signal 102. The mode selection signal may indicate any one of the various modes of operation as indicated in tables 1-12. The process then proceeds to Step 112 where the baseband processing module scrambles the data in accordance with a pseudo random sequence to produce scrambled data. Note that the pseudo random sequence may be generated from a feedback shift register with the generator polynomial of $S(x)=x^7+x^4+1$.

The process then proceeds to Step 114 where the baseband processing module selects one of a plurality of encoding modes based on the mode selection signal. The process then proceeds to Step 116 where the baseband processing module encodes the scrambled data in accordance with a selected encoding mode to produce encoded data. The encoding may be done utilizing any one or more a variety of coding schemes (e.g., convolutional coding, Reed-Solomon (RS) coding, turbo coding, turbo trellis coded modulation (TTCM) coding, LDPC (Low Density Parity Check) coding, etc.).

The process then proceeds to Step 118 where the baseband processing module determines a number of transmit streams based on the mode select signal. For example, the mode select signal will select a particular mode which indicates that 1, 2, 3, 4 or more antennae may be utilized for the transmission. Accordingly, the number of transmit streams will correspond to the number of antennae indicated by the mode select signal. The process then proceeds to Step 120 where the baseband processing module converts the encoded data into streams of symbols in accordance with the number of transmit streams in the mode select signal. This step will be described in greater detail with reference to FIG. 6.

Figure 6:
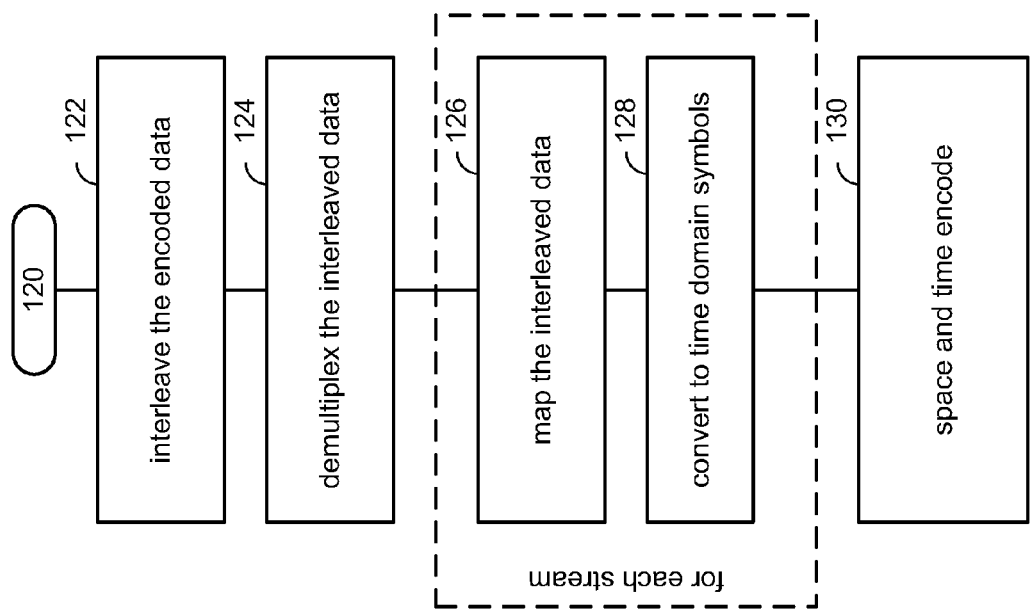
FIG. 6 is a diagram illustrating an embodiment of a method that further defines Step 120 of FIG. 5.

FIG. 6 is a diagram illustrating an embodiment of a method that further defines Step 120 of FIG. 5. This diagram shows a method performed by the baseband processing module to convert the encoded data into streams of symbols in accordance with the number of transmit streams and the mode select signal. Such processing begins at Step 122 where the baseband processing module interleaves the encoded data over multiple symbols and subcarriers of a channel to produce interleaved data. In general, the interleaving process is designed to spread the encoded data over multiple symbols and transmit streams. This allows improved detection and error correction capability at the receiver. In one embodiment, the interleaving process will follow the IEEE 802.11(a) or (g) standard for backward compatible modes. For higher performance modes (e.g., IEEE 802.11(n), the interleaving will also be done over multiple transmit paths or streams.

The process then proceeds to Step 124 where the baseband processing module demultiplexes the interleaved data into a number of parallel streams of interleaved data. The number of parallel streams corresponds to the number of transmit streams, which in turn corresponds to the number of antennae indicated by the particular mode being utilized. The process then continues to Steps 126 and 128, where for each of the parallel streams of interleaved data, the baseband processing module maps the interleaved data into a quadrature amplitude modulated (QAM) symbol to produce frequency domain symbols at Step 126. At Step 128, the baseband processing module converts the frequency domain symbols into time domain symbols, which may be done utilizing an inverse fast Fourier transform. The conversion of the frequency domain symbols into the time domain symbols may further include adding a cyclic prefix to allow removal of intersymbol interference at the receiver. Note that the length of the inverse fast Fourier transform and cyclic prefix are defined in the mode tables of tables 1-12. In general, a 64-point inverse fast Fourier transform is employed for 20 MHz channels and 128-point inverse fast Fourier transform is employed for 40 MHz channels.

The process then proceeds to Step 130 where the baseband processing module space and time encodes the time domain symbols for each of the parallel streams of interleaved data to produce the streams of symbols. In one embodiment, the space and time encoding may be done by space and time encoding the time domain symbols of the parallel streams of interleaved data into a corresponding number of streams of symbols utilizing an encoding matrix. Alternatively, the space and time encoding may be done by space and time encoding the time domain symbols of M-parallel streams of interleaved data into P-streams of symbols utilizing the encoding matrix, where P=2M. In one embodiment the encoding matrix may comprise a form of:

$$\begin{bmatrix} C_1 & C_2 & C_3 & C_4 & \ldots & C_{2M-1} & C_{2M} \\ -C_2^* & C_1^* & -C_4^* & C_3^* & \ldots & -C_{2M}^* & C_{2M-1}^* \end{bmatrix}$$

The number of rows of the encoding matrix corresponds to M and the number of columns of the encoding matrix corresponds to P. The particular symbol values of the constants within the encoding matrix may be real or imaginary numbers.

Figure 9:
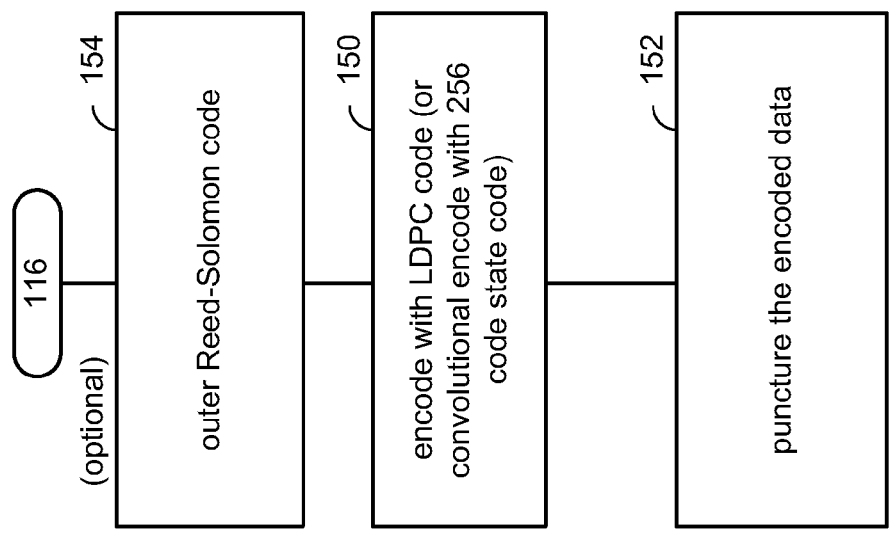
FIGS. 7-9 are diagrams illustrating various embodiments for encoding the scrambled data.
Figure 8:
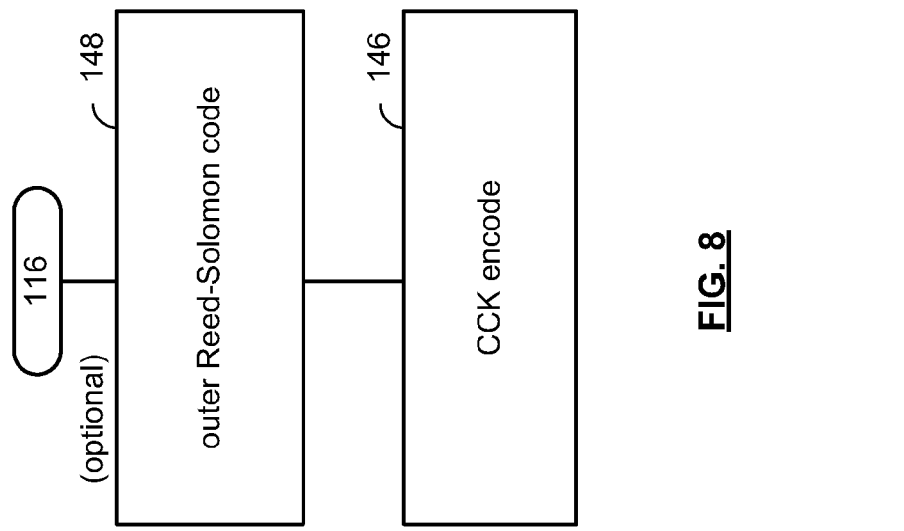
Figure 7:
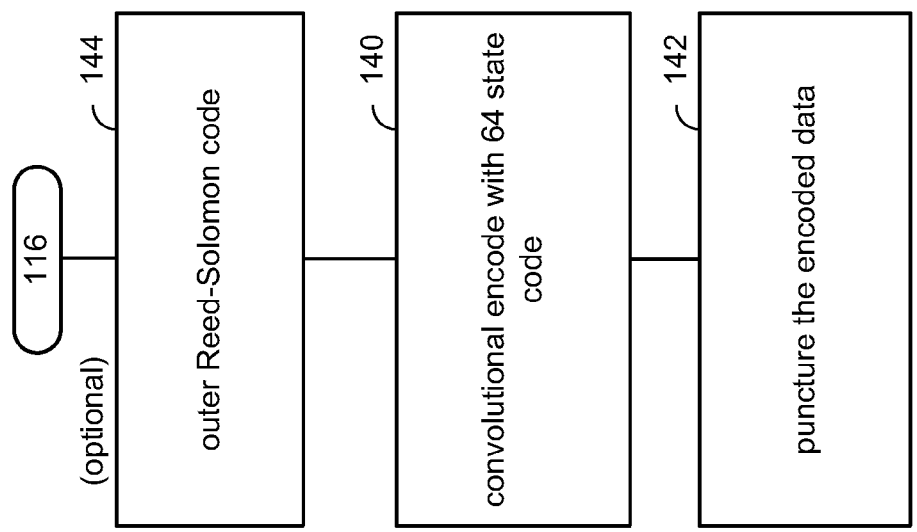

FIGS. 7-9 are diagrams illustrating various embodiments for encoding the scrambled data.

FIG. 7 is a diagram of one method that may be utilized by the baseband processing module to encode the scrambled data at Step 116 of FIG. 5. In this method, the encoding of FIG. 7 may include an optional Step 144 where the baseband processing module may optionally perform encoding with an outer Reed-Solomon (RS) code to produce RS encoded data. It is noted that Step 144 may be conducted in parallel with Step 140 described below.

Also, the process continues at Step 140 where the baseband processing module performs a convolutional encoding with a 64 state code and generator polynomials of $G_0=133_8$ and $G_1=171_8$ on the scrambled data (that may or may not have undergone RS encoding) to produce convolutional encoded data. The process then proceeds to Step 142 where the baseband processing module punctures the convolutional encoded data at one of a plurality of rates in accordance with the mode selection signal to produce the encoded data. Note that the puncture rates may include 1/2, 2/3 and/or 3/4, or any rate as specified in tables 1-12. Note that, for a particular mode, the rate may be selected for backward compatibility with IEEE 802.11(a), IEEE 802.11(g), or IEEE 802.11(n) rate requirements.

FIG. 8 is a diagram of another encoding method that may be utilized by the baseband processing module to encode the scrambled data at Step 116 of FIG. 5. In this embodiment, the encoding of FIG. 8 may include an optional Step 148 where the baseband processing module may optionally perform encoding with an outer RS code to produce RS encoded data. It is noted that Step 148 may be conducted in parallel with Step 146 described below.

The method then continues at Step 146 where the baseband processing module encodes the scrambled data (that may or may not have undergone RS encoding) in accordance with a complimentary code keying (CCK) code to produce the encoded data. This may be done in accordance with IEEE 802.11(b) specifications, IEEE 802.11(g), and/or IEEE 802.11(n) specifications.

FIG. 9 is a diagram of yet another method for encoding the scrambled data at Step 116, which may be performed by the baseband processing module. In this embodiment, the encoding of FIG. 9 may include an optional Step 154 where the baseband processing module may optionally perform encoding with an outer RS code to produce RS encoded data.

Then, in some embodiments, the process continues at Step 150 where the baseband processing module performs LDPC (Low Density Parity Check) coding on the scrambled data (that may or may not have undergone RS encoding) to produce LDPC coded bits. Alternatively, the Step 150 may operate by performing convolutional encoding with a 256 state code and generator polynomials of $G_0=561_8$ and $G_1=753_8$ on the scrambled data the scrambled data (that may or may not have undergone RS encoding) to produce convolutional encoded data. The process then proceeds to Step 152 where the baseband processing module punctures the convolutional encoded data at one of the plurality of rates in accordance with a mode selection signal to produce encoded data. Note that the puncture rate is indicated in the tables 1-12 for the corresponding mode.

The encoding of FIG. 9 may further include the optional Step 154 where the baseband processing module combines the convolutional encoding with an outer Reed Solomon code to produce the convolutional encoded data.

Figure 10A:
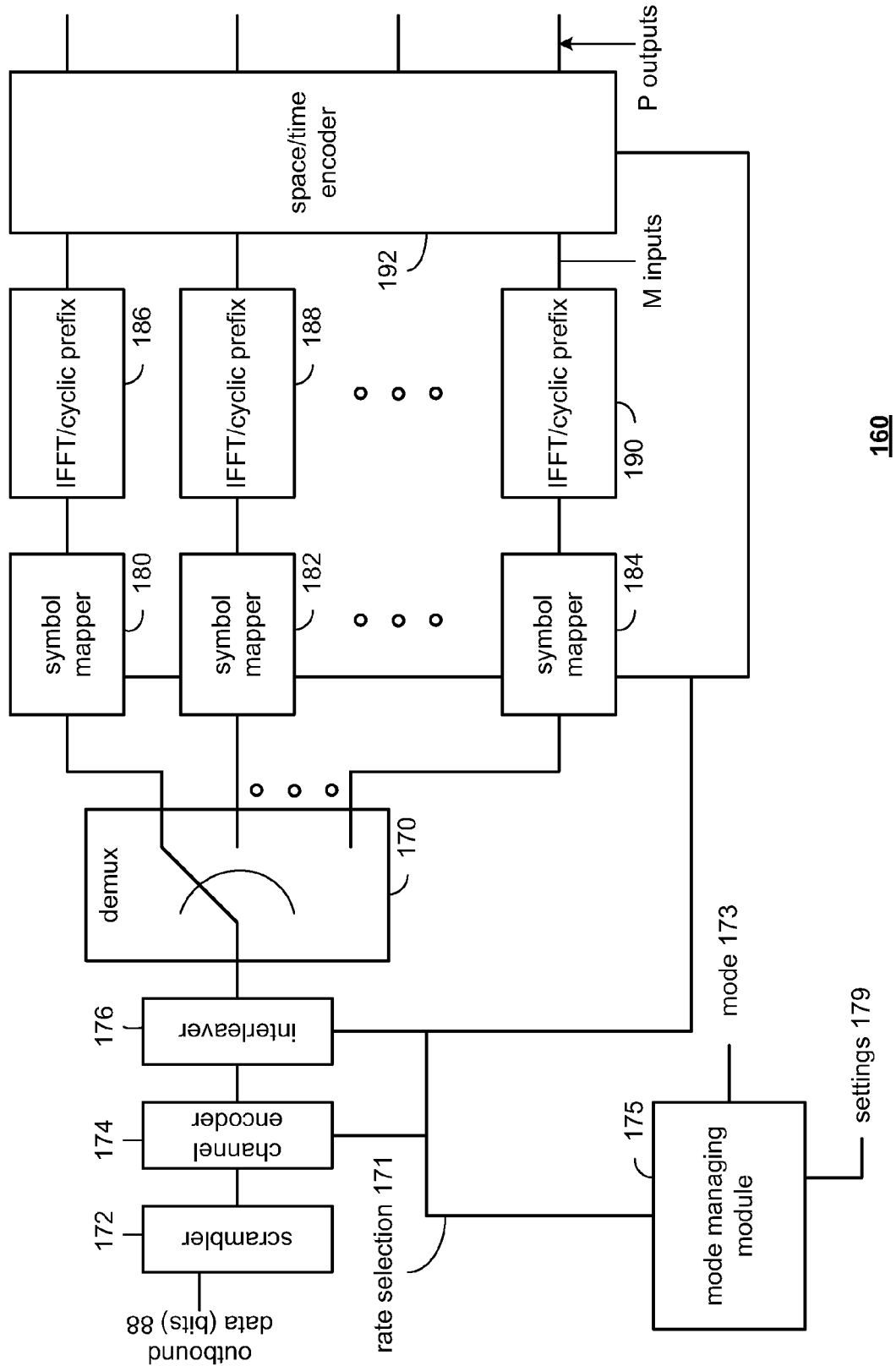
FIGS. 10A and 10B are diagrams illustrating embodiments of a radio transmitter.
Figure 10B:
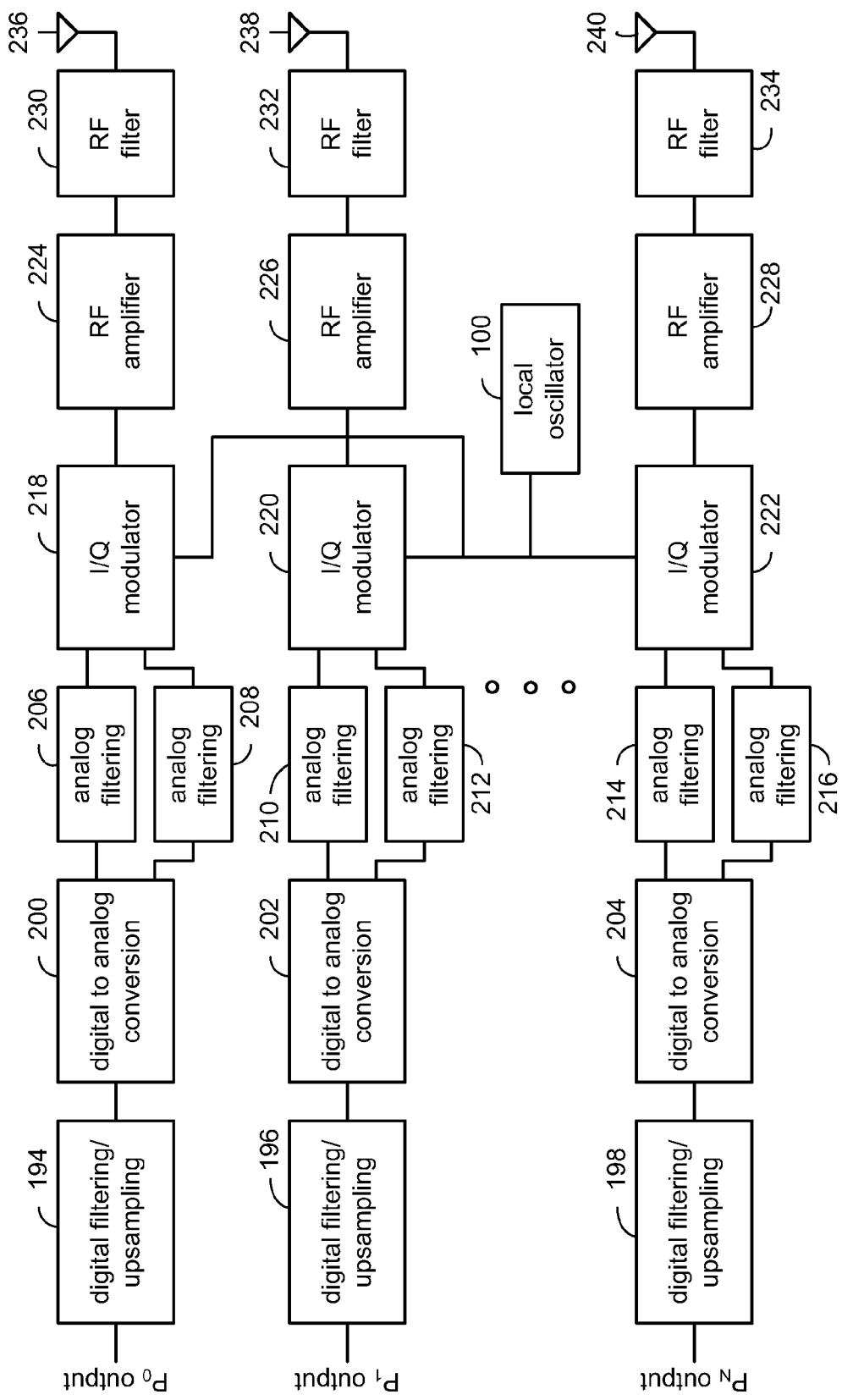

FIGS. 10A and 10B are diagrams illustrating embodiments of a radio transmitter. This may involve the PMD module of a WLAN transmitter. In FIG. 10A, the baseband processing is shown to include a scrambler 172, channel encoder 174, interleaver 176, demultiplexer 170, a plurality of symbol mappers 180-184, a plurality of inverse fast Fourier transform (IFFT)/cyclic prefix addition modules 186-190 and a space/time encoder 192. The baseband portion of the transmitter may further include a mode manager module 175 that receives the mode selection signal 173 and produces settings 179 for the radio transmitter portion and produces the rate selection 171 for the baseband portion. In this embodiment, the scrambler 172, the channel encoder 174, and the interleaver 176 comprise an error protection module. The symbol mappers 180-184, the plurality of IFFT/cyclic prefix modules 186-190, the space time encoder 192 comprise a portion of the digital baseband processing module.

In operations, the scrambler 172 adds (e.g., in a Galois Finite Field (GF2)) a pseudo random sequence to the outbound data bits 88 to make the data appear random. A pseudo random sequence may be generated from a feedback shift register with the generator polynomial of $S(x)=x^7+x^4+1$ to produce scrambled data. The channel encoder 174 receives the scrambled data and generates a new sequence of bits with redundancy. This will enable improved detection at the receiver. The channel encoder 174 may operate in one of a plurality of modes. For example, for backward compatibility with IEEE 802.11(a) and IEEE 802.11(g), the channel encoder has the form of a rate 1/2 convolutional encoder with 64 states and a generator polynomials of $G_0=133_8$ and $G_1=171_8$. The output of the convolutional encoder may be punctured to rates of 1/2, 2/3, and 3/4 according to the specified rate tables (e.g., tables 1-12). For backward compatibility with IEEE 802.11(b) and the CCK modes of IEEE 802.11(g), the channel encoder has the form of a CCK code as defined in IEEE 802.11(b). For higher data rates (such as those illustrated in tables 6, 8 and 10), the channel encoder may use the same convolution encoding as described above or it may use a more powerful code, including a convolutional code with more states, any one or more of the various types of error correction codes (ECCs) mentioned above (e.g., RS, LDPC, turbo, TTCM, etc.) a parallel concatenated (turbo) code and/ or a low density parity check (LDPC) block code. Further, any one of these codes may be combined with an outer Reed Solomon code. Based on a balancing of performance, backward compatibility and low latency, one or more of these codes may be optimal. Note that the concatenated turbo encoding and low density parity check will be described in greater detail with reference to subsequent Figures.

The interleaver 176 receives the encoded data and spreads it over multiple symbols and transmit streams. This allows improved detection and error correction capabilities at the receiver. In one embodiment, the interleaver 176 will follow the IEEE 802.11(a) or (g) standard in the backward compatible modes. For higher performance modes (e.g., such as those illustrated in tables 6, 8 and 10), the interleaver will interleave data over multiple transmit streams. The demultiplexer 170 converts the serial interleave stream from interleaver 176 into M-parallel streams for transmission.

Each symbol mapper 180-184 receives a corresponding one of the M-parallel paths of data from the demultiplexer. Each symbol mapper 180-182 lock maps bit streams to quadrature amplitude modulated QAM symbols (e.g., BPSK, QPSK, 16 QAM, 64 QAM, 256 QAM, etc.) according to the rate tables (e.g., tables 1-12). For IEEE 802.11(a) backward compatibility, double Gray coding may be used.

The map symbols produced by each of the symbol mappers 180-184 are provided to the IFFT/cyclic prefix addition modules 186-190, which performs frequency domain to time domain conversions and adds a prefix, which allows removal of inter-symbol interference at the receiver. Note that the length of the IFFT and cyclic prefix are defined in the mode tables of tables 1-12. In general, a 64-point IFFT will be used for 20 MHz channels and 128-point IFFT will be used for 40 MHz channels.

The space/time encoder 192 receives the M-parallel paths of time domain symbols and converts them into P-output symbols. In one embodiment, the number of M-input paths will equal the number of P-output paths. In another embodiment, the number of output paths P will equal 2M paths. For each of the paths, the space/time encoder multiples the input symbols with an encoding matrix that has the form of $$\begin{bmatrix} c_1 & c_2 & c_3 & c_4 & \ldots & c_{2M-1} & c_{2M} \\ -c_2^* & c_1^* & -c_4^* & c_3^* & \ldots & -c_{2M}^* & c_{2M-1}^* \end{bmatrix}.$$

The rows of the encoding matrix correspond to the number of input paths and the columns correspond to the number of output paths.

FIG. 10B illustrates the radio portion of the transmitter that includes a plurality of digital filter/up-sampling modules 194-198, digital-to-analog conversion modules 200-204, analog filters 206-216, I/Q modulators 218-222, RF amplifiers 224-228, RF filters 230-234 and antennae 236-240. The P-outputs from the space/time encoder 192 are received by respective digital filtering/up-sampling modules 194-198. In one embodiment, the digital filters/up sampling modules 194-198 are part of the digital baseband processing module and the remaining components comprise the plurality of RF front-ends. In such an embodiment, the digital baseband processing module and the RF front end comprise a direct conversion module.

In operation, the number of radio paths that are active correspond to the number of P-outputs. For example, if only one P-output path is generated, only one of the radio transmitter paths will be active. As one of average skill in the art will appreciate, the number of output paths may range from one to any desired number.

The digital filtering/up-sampling modules 194-198 filter the corresponding symbols and adjust the sampling rates to correspond with the desired sampling rates of the digital-to-analog conversion modules 200-204. The digital-to-analog conversion modules 200-204 convert the digital filtered and up-sampled signals into corresponding in-phase and quadrature analog signals. The analog filters 206-214 filter the corresponding in-phase and/or quadrature components of the analog signals, and provide the filtered signals to the corresponding I/Q modulators 218-222. The I/Q modulators 218-222 based on a local oscillation, which is produced by a local oscillator 100, up-converts the I/Q signals into radio frequency signals.

The RF amplifiers 224-228 amplify the RF signals which are then subsequently filtered via RF filters 230-234 before being transmitted via antennae 236-240.

Figure 11A:
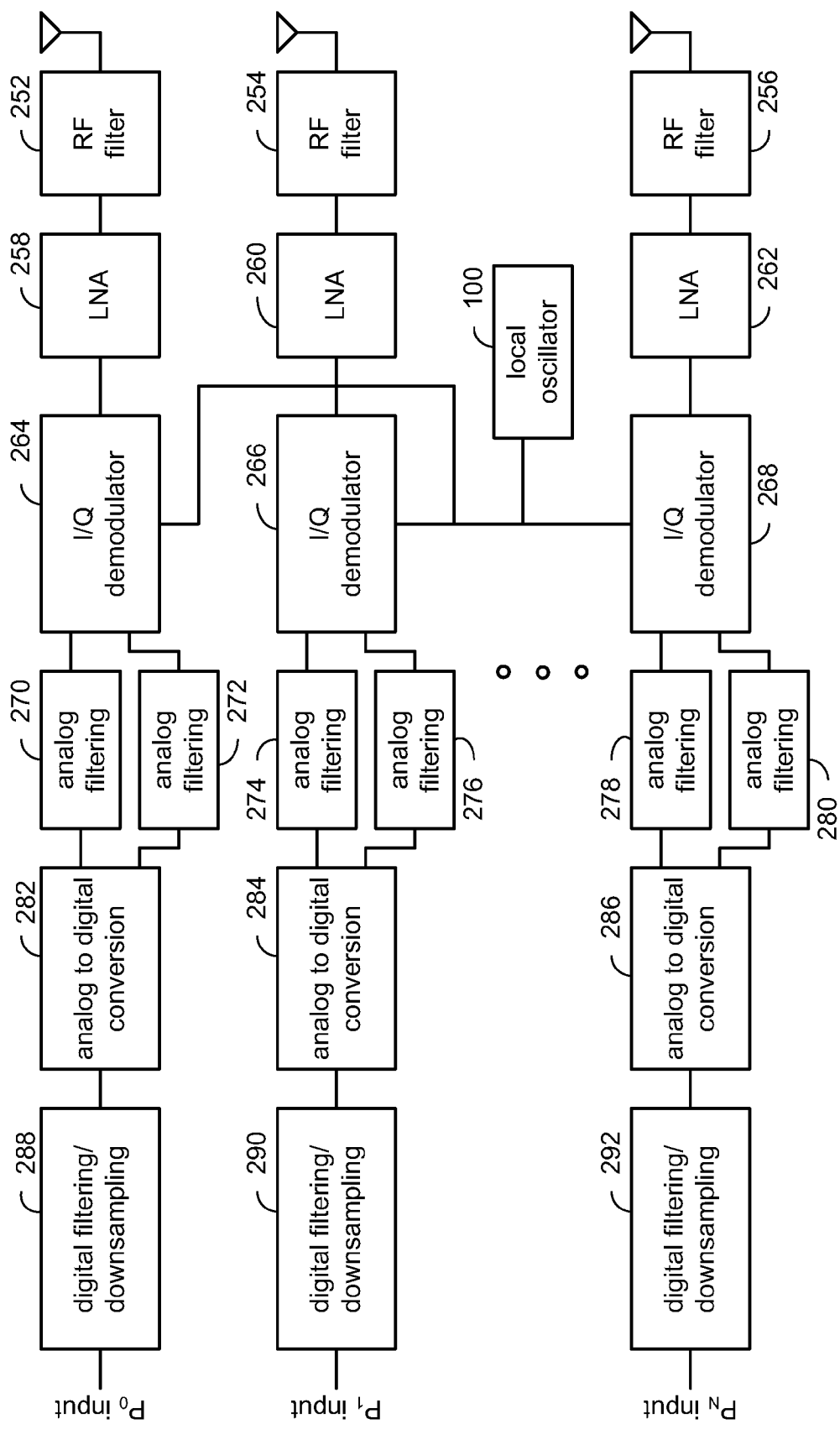
FIGS. 11A and 11B are diagrams illustrating embodiments of a radio receiver.
Figure 11B:
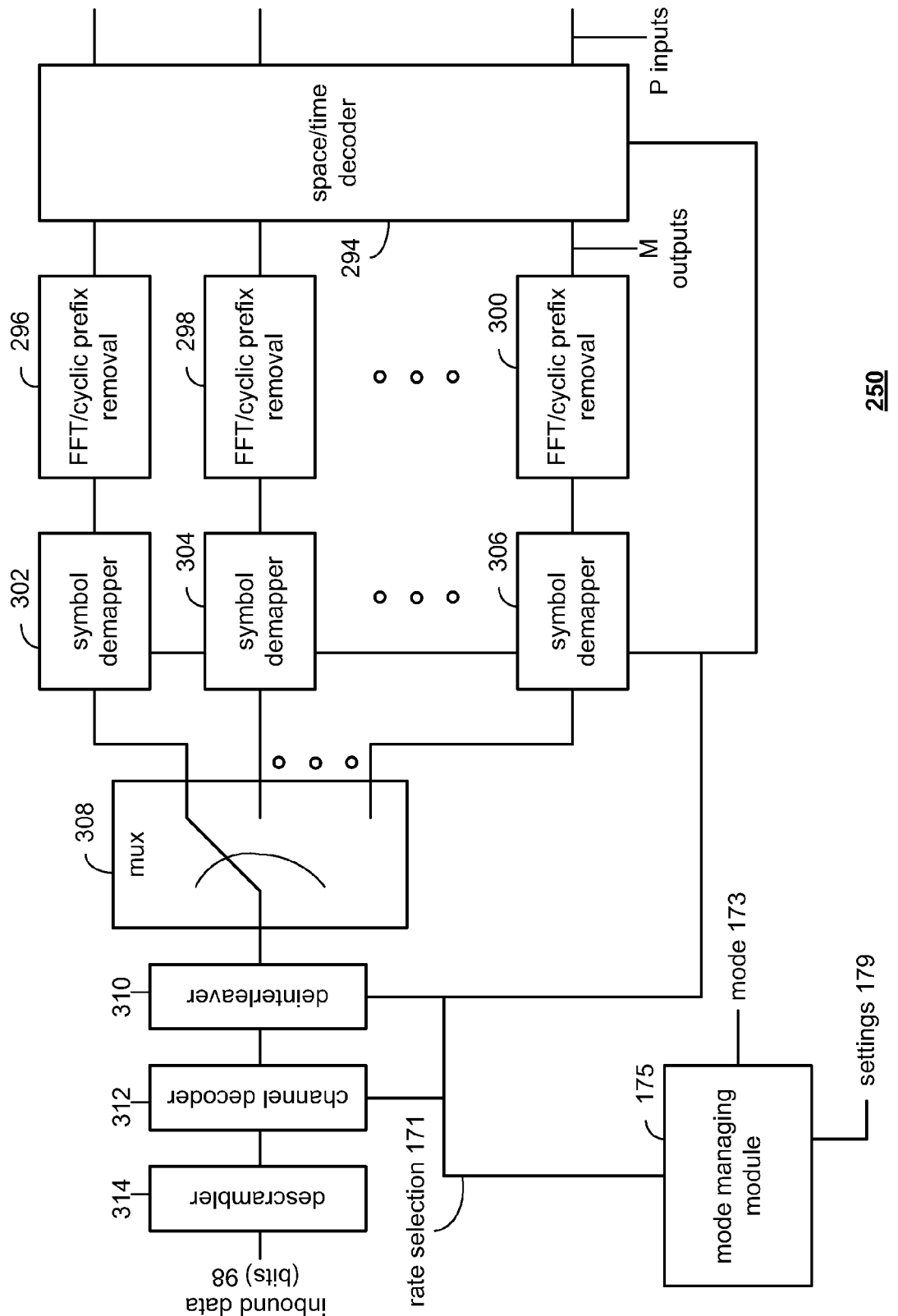

FIGS. 11A and 11B are diagrams illustrating embodiments of a radio receiver (as shown by reference numeral 250). These diagrams illustrate a schematic block diagram of another embodiment of a receiver. FIG. 11A illustrates the analog portion of the receiver which includes a plurality of receiver paths. Each receiver path includes an antenna, RF filters 252-256, low noise amplifiers 258-262, I/Q demodulators 264-268, analog filters 270-280, analog-to-digital converters 282-286 and digital filters and down-sampling modules 288-290.

In operation, the antennae receive inbound RF signals, which are band-pass filtered via the RF filters 252-256. The corresponding low noise amplifiers 258-262 amplify the filtered signals and provide them to the corresponding I/Q demodulators 264-268. The I/Q demodulators 264-268, based on a local oscillation, which is produced by local oscillator 100, down-converts the RF signals into baseband in-phase and quadrature analog signals.

The corresponding analog filters 270-280 filter the in-phase and quadrature analog components, respectively. The analog-to-digital converters 282-286 convert the in-phase and quadrature analog signals into a digital signal. The digital filtering and down-sampling modules 288-290 filter the digital signals and adjust the sampling rate to correspond to the rate of the baseband processing, which will be described in FIG. 11B.

FIG. 11B illustrates the baseband processing of a receiver. The baseband processing includes a space/time decoder 294, a plurality of fast Fourier transform (FFT)/cyclic prefix removal modules 296-300, a plurality of symbol demapping modules 302-306, a multiplexer 308, a deinterleaver 310, a channel decoder 312, and a descramble module 314. The baseband processing module may further include a mode managing module 175, which produces rate selections 171 and settings 179 based on mode selections 173. The space/time decoding module 294, which performs the inverse function of space/time encoder 192, receives P-inputs from the receiver paths and produce M-output paths. The M-output paths are processed via the FFT/cyclic prefix removal modules 296-300 which perform the inverse function of the IFFT/cyclic prefix addition modules 186-190 to produce frequency domain symbols.

The symbol demapping modules 302-306 convert the frequency domain symbols into data utilizing an inverse process of the symbol mappers 180-184. The multiplexer 308 combines the demapped symbol streams into a single path.

The deinterleaver 310 deinterleaves the single path utilizing an inverse function of the function performed by interleaver 176. The deinterleaved data is then provided to the channel decoder 312 which performs the inverse function of channel encoder 174. The descrambler 314 receives the decoded data and performs the inverse function of scrambler 172 to produce the inbound data 98.

Figure 12:
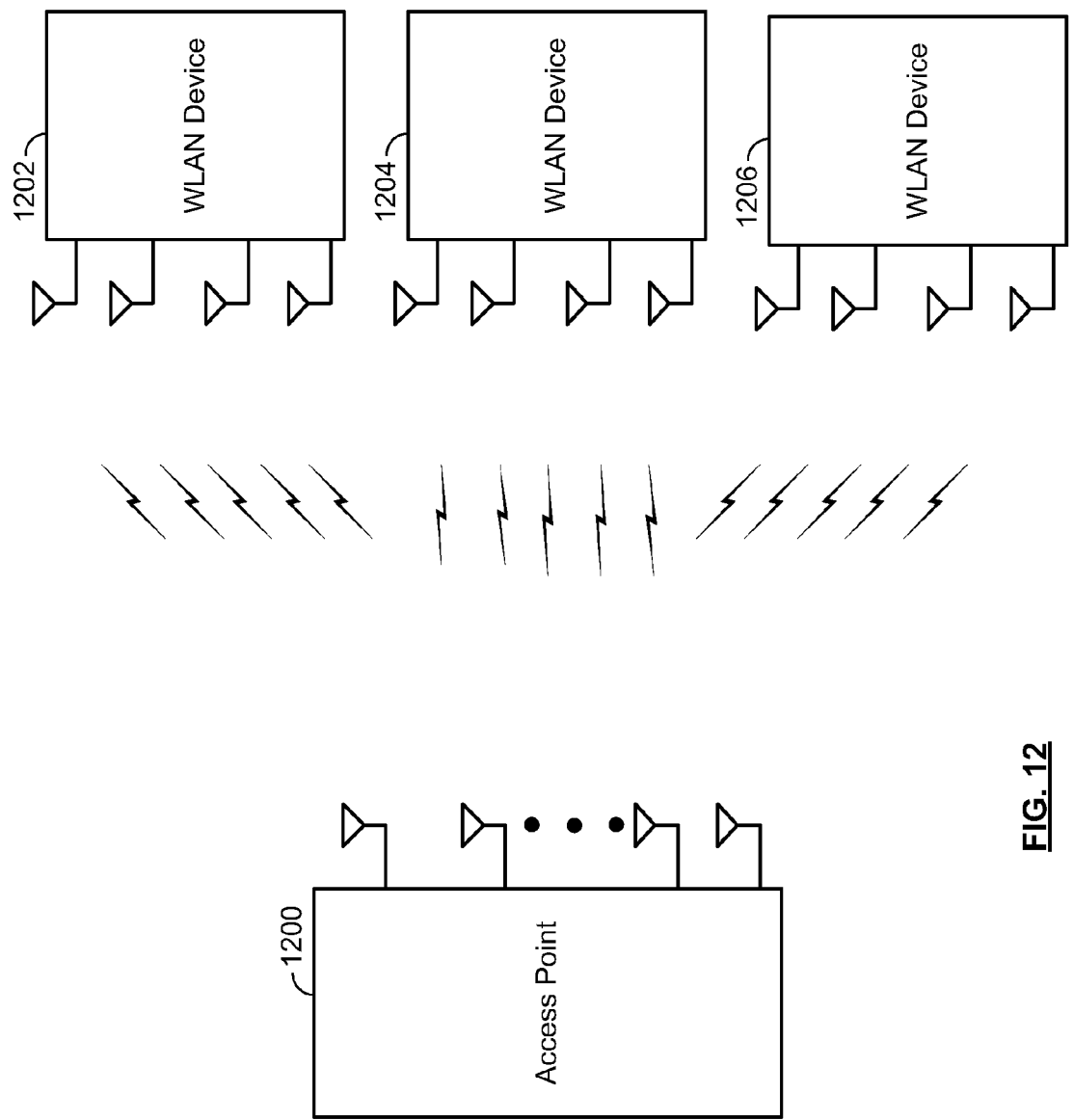
FIG. 12 is a diagram illustrating an embodiment of an access point (AP) and multiple wireless local area network (WLAN) devices operating according to one or more various aspects and/or embodiments of the invention.

FIG. 12 is a diagram illustrating an embodiment of an access point (AP) and multiple wireless local area network (WLAN) devices operating according to one or more various aspects and/or embodiments of the invention. The AP point 1200 may compatible with any number of communication protocols and/or standards, e.g., IEEE 802.11(a), IEEE 802.11(b), IEEE 802.11(g), IEEE 802.11(n), as well as in accordance with various aspects of invention. According to certain aspects of the present invention, the AP supports backwards compatibility with prior versions of the IEEE 802.11x standards as well. According to other aspects of the present invention, the AP 1200 supports communications with the WLAN devices 1202, 1204, and 1206 with channel bandwidths, MIMO dimensions, and at data throughput rates unsupported by the prior IEEE 802.11x operating standards. For example, the access point 1200 and WLAN devices 1202, 1204, and 1206 may support channel bandwidths from those of prior version devices and from 40 MHz to 1.28 GHz and above. The access point 1200 and WLAN devices 1202, 1204, and 1206 support MIMO dimensions to 4×4 and greater. With these characteristics, the access point 1200 and WLAN devices 1202, 1204, and 1206 may support data throughput rates to 1 GHz and above.

The AP 1200 supports simultaneous communications with more than one of the WLAN devices 1202, 1204, and 1206. Simultaneous communications may be serviced via OFDM tone allocations (e.g., certain number of OFDM tones in a given cluster), MIMO dimension multiplexing, or via other techniques. With some simultaneous communications, the AP 1200 may allocate one or more of the multiple antennae thereof respectively to support communication with each WLAN device 1202, 1204, and 1206, for example.

Further, the AP 1200 and WLAN devices 1202, 1204, and 1206 are backwards compatible with the IEEE 802.11(a), (b), (g), and (n) operating standards. In supporting such backwards compatibility, these devices support signal formats and structures that are consistent with these prior operating standards.

Generally, communications as described herein may be targeted for reception by a single receiver or for multiple individual receivers (e.g. via multi-user multiple input multiple output (MU-MIMO), and/or OFDMA transmissions, which are different than single transmissions with a multi-receiver address). For example, a single OFDMA transmission uses different tones or sets of tones (e.g., clusters or channels) to send distinct sets of information, each set of set of information transmitted to one or more receivers simultaneously in the time domain. Again, an OFDMA transmission sent to one user is equivalent to an OFDM transmission (e.g., OFDM may be viewed as being a subset of OFDMA). A single MU-MIMO transmission may include spatially-diverse signals over a common set of tones, each containing distinct information and each transmitted to one or more distinct receivers. Some single transmissions may be a combination of OFDMA and MU-MIMO. Multi-user (MU), as described herein, may be viewed as being multiple users sharing at least one cluster (e.g., at least one channel within at least one band) at a same time.

MIMO transceivers illustrated may include SISO, SIMO, and MISO transceivers. The clusters employed for such communications (e.g., OFDMA communications) may be continuous (e.g., adjacent to one another) or discontinuous (e.g., separated by a guard interval of band gap). Transmissions on different OFDMA clusters may be simultaneous or non-simultaneous. Such wireless communication devices as described herein may be capable of supporting communications via a single cluster or any combination thereof. Legacy users and new version users (e.g., TGac MU-MIMO, OFDMA, MU-MIMO/OFDMA, etc.) may share bandwidth at a given time or they can be scheduled at different times for certain embodiments. Such a MU-MIMO/OFDMA transmitter (e.g., an AP or a STA) may transmit packets to more than one receiving wireless communication device (e.g., STA) on the same cluster (e.g., at least one channel within at least one band) in a single aggregated packet (such as being time multiplexed). In such an instance, channel training may be required for all communication links to the respective receiving wireless communication devices (e.g., STAs).

Figure 13:
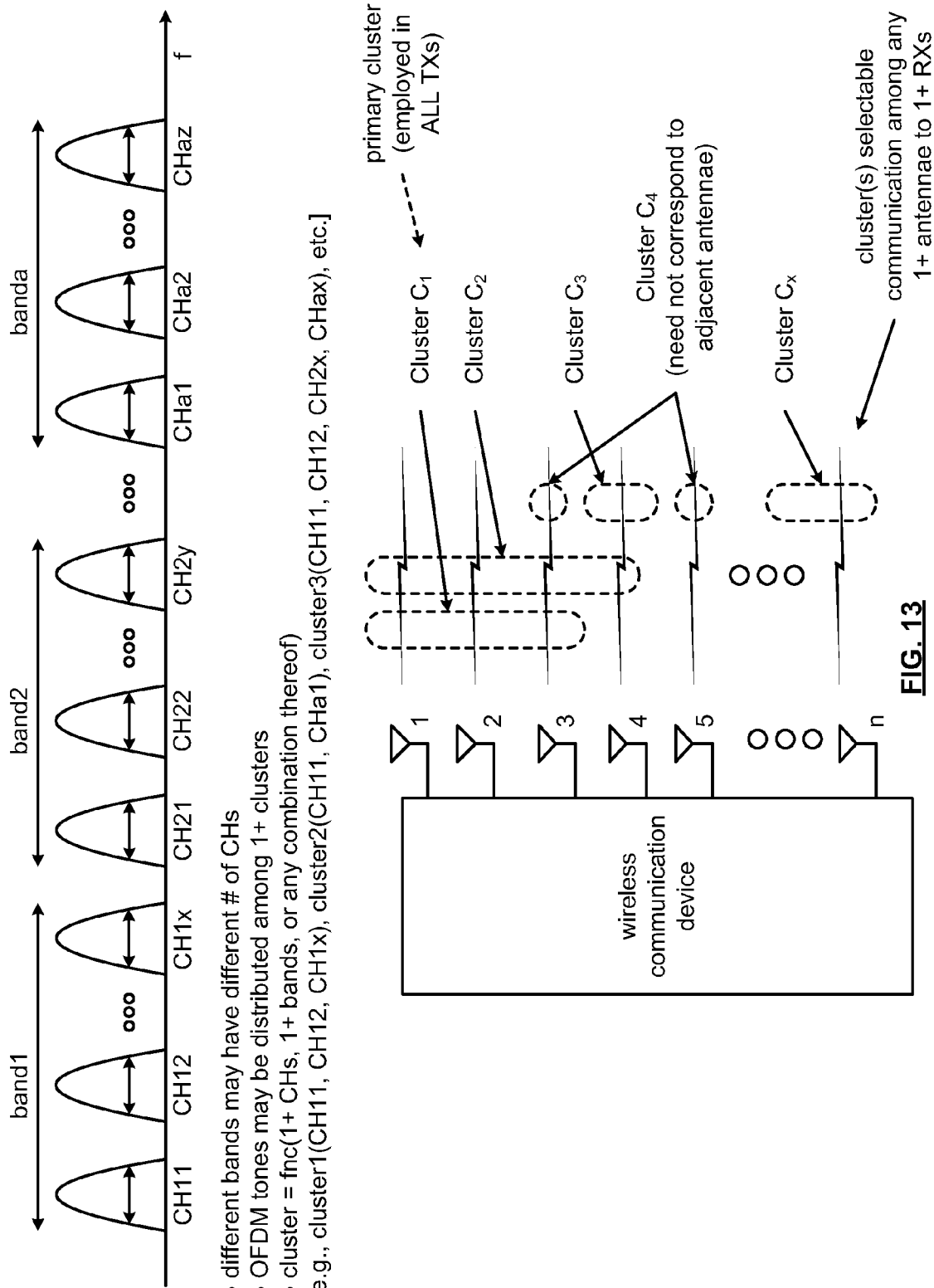
FIG. 13 is a diagram illustrating an embodiment of a wireless communication device, and clusters, as may be employed for supporting communications with at least one additional wireless communication device.

FIG. 13 is a diagram illustrating an embodiment of a wireless communication device, and clusters, as may be employed for supporting communications with at least one additional wireless communication device. Generally speaking, a cluster may be viewed as a depiction of the mapping of tones, such as for an OFDM symbol, within or among one or more channels (e.g., sub-divided portions of the spectrum) that may be situated in one or more bands (e.g., portions of the spectrum separated by relatively larger amounts). As an example, various channels of 20 MHz may be situated within or centered around a 5 GHz band. The channels within any such band may be continuous (e.g., adjacent to one another) or discontinuous (e.g., separated by some guard interval or band gap). Oftentimes, one or more channels may be situated within a given band, and different bands need not necessarily have a same number of channels therein. Again, a cluster may generally be understood as any combination one or more channels among one or more bands.

The wireless communication device of this diagram may be of any of the various types and/or equivalents described herein (e.g., AP, WLAN device, or other wireless communication device including, though not limited to, any of those depicted in FIG. 1, etc.). The wireless communication device includes multiple antennae from which one or more signals may be transmitted to one or more receiving wireless communication devices and/or received from one or more other wireless communication devices.

Such clusters may be used for transmissions of signals via various one or more selected antennae. For example, different clusters are shown as being used to transmit signals respectively using different one or more antennae.

Also, it is noted that, with respect to certain embodiments, general nomenclature may be employed wherein a transmitting wireless communication device (e.g., such as being an Access point (AP), or a wireless station (STA) operating as an 'AP' with respect to other STAs) initiates communications, and/or operates as a network controller type of wireless communication device, with respect to a number of other, receiving wireless communication devices (e.g., such as being STAs), and the receiving wireless communication devices (e.g., such as being STAs) responding to and cooperating with the transmitting wireless communication device in supporting such communications. Of course, while this general nomenclature of transmitting wireless communication device(s) and receiving wireless communication device(s) may be employed to differentiate the operations as performed by such different wireless communication devices within a communication system, all such wireless communication devices within such a communication system may of course support bi-directional communications to and from other wireless communication devices within the communication system. In other words, the various types of transmitting wireless communication device(s) and receiving wireless communication device(s) may all support bi-directional communications to and from other wireless communication devices within the communication system. Generally speaking, such capability, functionality, operations, etc. as described herein may be applied to any wireless communication device.

Various aspects and principles, and their equivalents, of the invention as presented herein may be adapted for use in various standards, protocols, and/or recommended practices (including those currently under development) such as those in accordance with IEEE 802.11x (e.g., where x is a, b, g, n, ac, ad, ae, af, ah, etc.).

In certain instances, various wireless communication devices may be implemented to support communications associated with monitoring and/or sensing of any of a variety of different conditions, parameters, etc. and provide such information to another wireless communication device. For example, in some instances, a wireless communication device may be implemented as a smart meter station (SMSTA), having certain characteristics similar to a wireless station (STA) such as in the context of a wireless local area network (WLAN), yet is operative to perform such communications associated with one or more measurements in accordance with monitoring and/or sensing. In certain applications, such devices may operate only very rarely. For example, when compared to the periods of time in which such a device is in power savings mode (e.g., a sleep mode, a reduced functionality operational mode a lowered power operational mode, etc.), the operational periods of time may be miniscule in comparison (e.g., only a few percentage or tenths, hundredths [or even smaller portion(s)] of percentage of the periods of time in which the device is in such a power savings mode, or even less).

For example, such a device may awaken from such a power savings mode only to perform certain operations. For example, such a device may awaken from such a power savings mode to perform sensing and/or measurement of one or more parameters, conditions, constraints, etc. During such an operational period (e.g., in which the device is not in a power savings mode), the device may also perform transmission of such information to another wireless communication device (e.g., an access point (AP), another SMSTA, a wireless station (STA), or such an SMSTA or STA operating as an AP, etc.). It is noted that such a device may enter into an operational mode for performing sensing and/or monitoring at a frequency that is different than (e.g., greater than) the frequency at which the device enters into an operational mode for performing transmissions. For example, such a device may awaken a certain number of times to make successive respective sensing and/or monitoring operations, and such data as is acquired during those operations may be stored (e.g., in a memory storage component within the device), and during a subsequent operational mode dedicated for transmission of the data, multiple data portions corresponding to multiple respective sensing and/or monitoring operations may be transmitted during that operational mode dedicated for transmission of the data.

Also, it is noted that, in certain embodiments, such a device may include both monitor and/or sensor capability as well as wireless communication capability. In other embodiments, such a device may be connected and/or coupled to a monitor and/or sensor and serve to effectuate wireless communications related to the monitoring and/or sensing operations of the monitor and/or sensor.

The application contexts of such devices may be varied, and some exemplary though non-exhaustive embodiments are provided and described below for illustrations to the reader. It is also noted that, in some applications, some of the devices may be battery operated in which energy conservation and efficiency may be of high importance. In addition, there are a number of applications in which such devices may be used in addition to or alternatively to smart meter applications; for example, certain wireless communication devices may be implemented to support cellular offload and/or other applications that are not normally or traditionally associated with WLAN applications. Some applications are particularly targeted and directed towards use in accordance with and in compliance with the currently developing IEEE 802.11ah standard.

Various mechanisms by which access to the communication media may be achieved may be different and particularly tailored for different contexts. For example, different communication access schemes may be applied at different respective times. That is to say, during a first time or during a first time period, a first communication medium access approach may be employed. During a second time or during a second time period, a second communication medium access approach may be employed. It is noted that the particular communication medium access approach employed any given time may be adaptively determined based upon one or more prior communication medium access approaches employed during one or more time periods.

Also, in an application in which there are multiple wireless communication devices implemented therein, different respective time periods may be employed for different groups of those wireless communication devices. For example, considering an embodiment in which multiple STAs are operative within a given communication device, those respective STAs may be subdivided into different respective groups that may have access to the communication medium a different respective time periods. It is noted that anyone given STA may be categorized within more than one group, in that, different respective groups of STAs may have some overlap in their respective contents. By using different respective time periods for use by different respective groups of devices, an increase in media access control (MAC) efficiency may be achieved among anyone or more of the respective devices within the wireless communication system. Also, by ensuring appropriate operation of the overall system, power consumption may be decreased. As mentioned above, this can be of utmost importance in certain applications such as those in which one or more of the devices are battery operated and energy conservation is of high importance. Also, utilizing different respective time periods for use by different groups of STAs can allow for simplification in accordance with MAC or physical layer (PHY) processing. For example, certain embodiments may employ limited preamble processing (e.g., such as in accordance with processing only a subset of, for example, a set of preambles used for normal range and/or extended range type communications) for simplification. In addition, the MAC protocol employed for certain respective time periods can be simplified.

It is noted that the in accordance with various aspects, and their equivalents, of the invention described herein may be generally applied to wireless communication devices including any number of types of wireless communication devices (e.g., STAs, APs, SMSTAs, and/or any combination thereof, etc.), certain desired embodiments are particularly tailored towards use with one or more SMSTAs.

Figure 14:
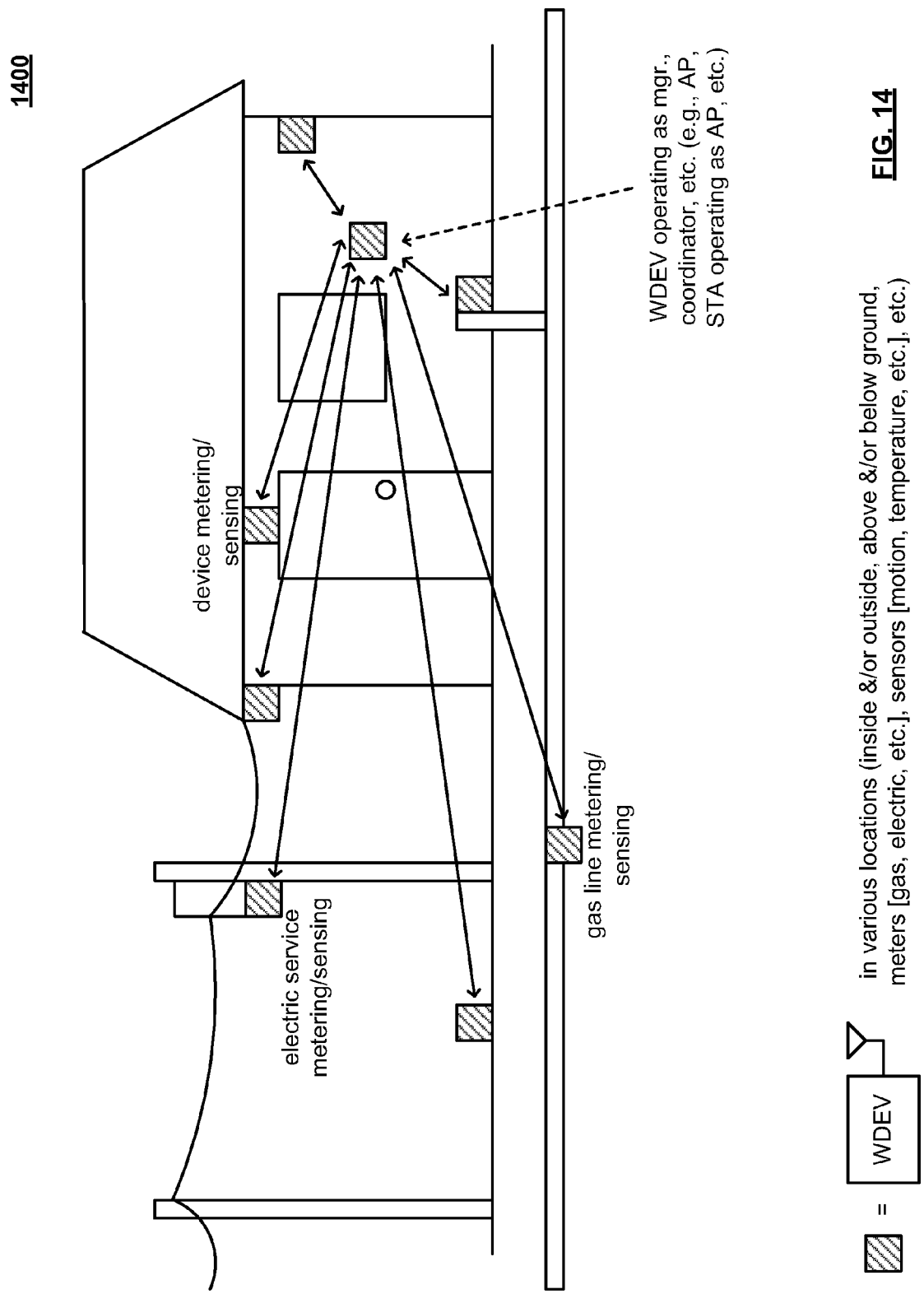
FIG. 14 illustrates an embodiment of a number of wireless communication devices implemented in various locations in an environment including a building or structure.

FIG. 14 illustrates an embodiment 1400 of a number of wireless communication devices implemented in various locations in an environment including a building or structure. In this diagram, multiple respective wireless communication devices are implemented to forward information related to monitoring and/or sensing to one particular wireless communication device that may be operating as a manager, coordinator, etc. such as may be implemented by an access point (AP) or a wireless station (STA) operating as an AP, or to a device which is reachable after forwarding to the AP (e.g., such as a middling communication device). Generally speaking, such wireless communication devices may be implemented to perform any of a number of data forwarding, monitoring and/or sensing operations. For example, in the context of a building or structure, there may be a number of services that are provided to that building or structure, including natural gas service, heating venting and air conditioning (HVAC), electrical service, security service, personnel monitoring service, asset monitoring service, television service, Internet service, and/or any other such service(s), etc. Alternatively, different respective monitors and/or sensors may be implemented throughout the environment to perform monitoring and/or sensing related to parameters not specifically related to services. As some examples, motion detection, temperature measurement (and/or other atmospheric and/or environmental measurements), etc. may be performed by different respective monitors and/or sensors implemented in various locations and for various purposes.

Different respective monitors and/or sensors may be implemented to provide information related to such monitoring and/or sensing functions wirelessly to the manager/coordinator wireless communication device. Such information may be provided continuously, periodically, sporadically, intermittently, etc. as may be desired in certain applications.

In addition, it is noted that such communications between such a manager/coordinator wireless communication device of the different respective monitors and/or sensors may be cooperative in accordance with such bidirectional indications, in that, the manager/coordinator wireless communication device may direct the respective monitors and/or sensors to perform certain related functions at subsequent times.

Figure 15:
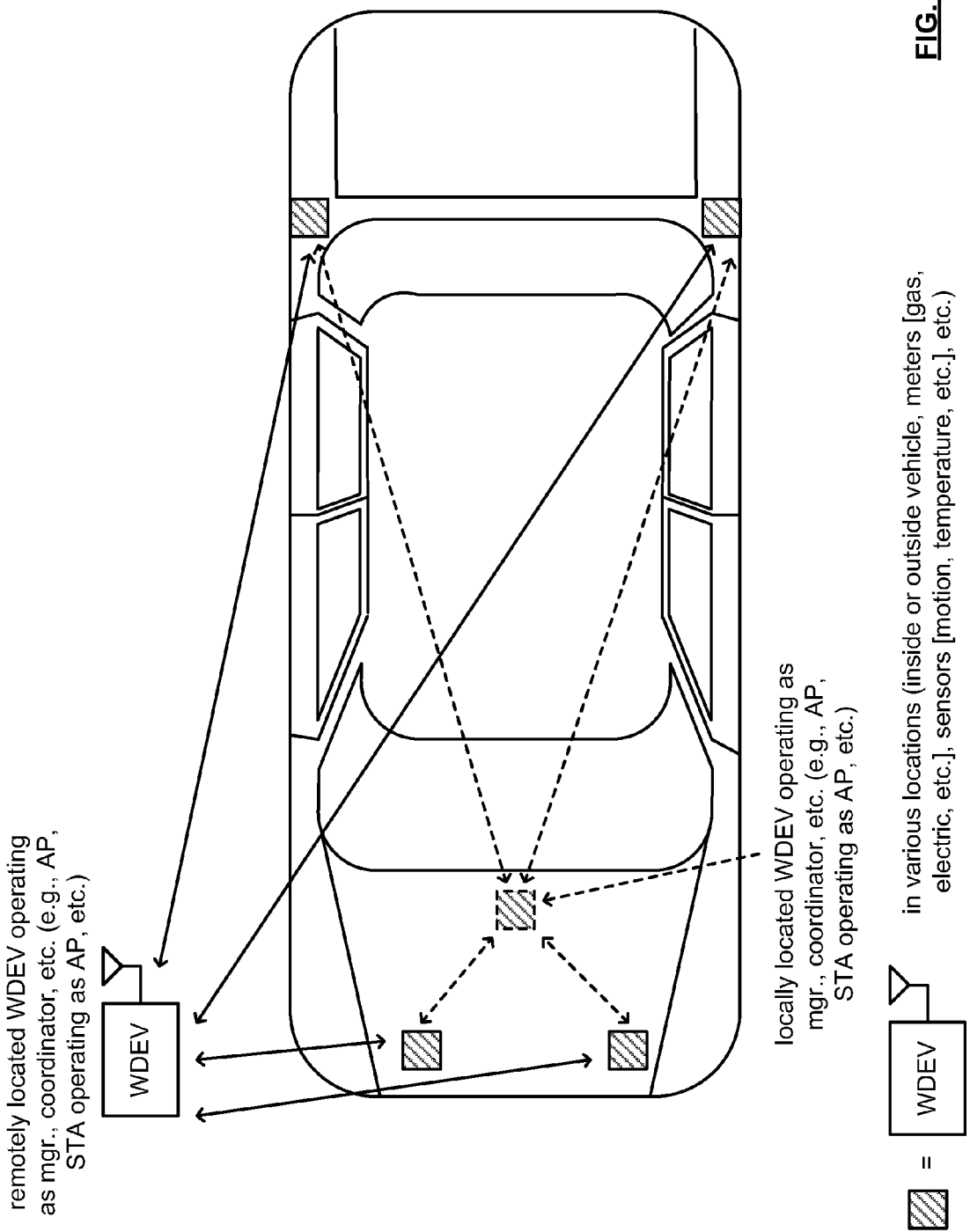
FIG. 15 illustrates an embodiment of a number of wireless communication devices implemented in various locations in a vehicular environment.

FIG. 15 illustrates an embodiment 1500 of a number of wireless communication devices implemented in various locations in a vehicular environment. This diagram pictorially depicts a number of different sensors implemented throughout a vehicle which may perform any of a number of monitoring and/or sensing functions. For example, operational characteristics associated with different mechanical components (e.g., temperature, operating condition, etc. of any of a number of components within the vehicle, such as the engine, compressors, pumps, batteries, etc.) may all be monitored and information related to that monitoring may be provided to a coordinator/manager wireless communication device.

Figure 16:
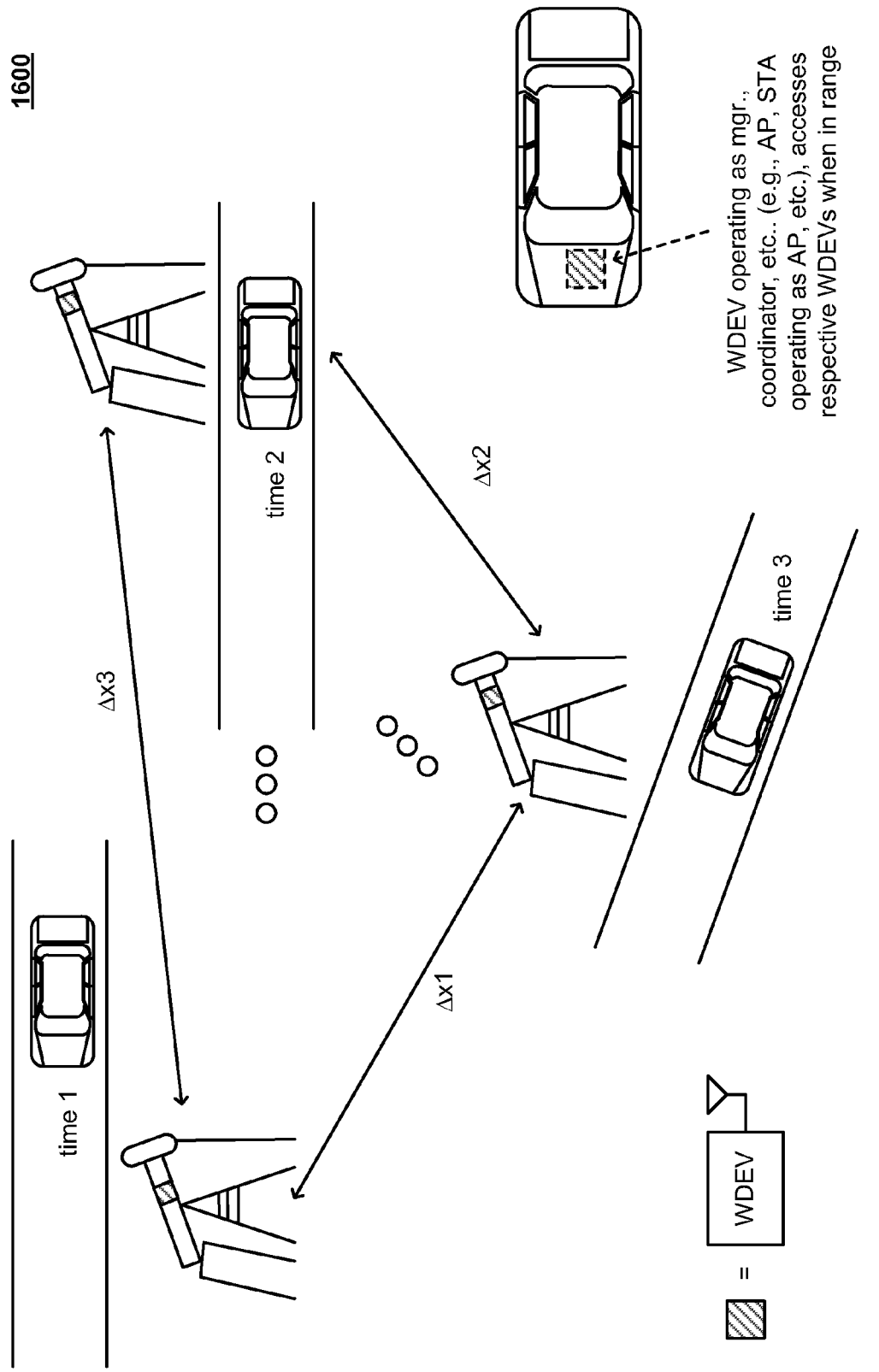
FIG. 16 illustrates an embodiment of a number of wireless communication devices implemented in various locations throughout a broadly distributed industrial environment.

FIG. 16 illustrates an embodiment 1600 of a number of wireless communication devices implemented in various locations throughout a broadly distributed industrial environment. This diagram pictorially illustrates a number of different respective sensors that may be implemented in various locations that are very remote with respect to one another. This diagram relates to a number of sensors which may be implemented within different locations that have little or no wireless communication infrastructure associated therewith. For example, in the oil industry, different respective pumps may be implemented in very remote locations, and service personnel need physically to visit the different respective locations to ascertain the operation of the various equipment and components there. A manager/coordinator wireless communication device may be implemented within a vehicle, or within a portable component such as laptop computer included within the vehicle, and as the vehicle travels to each respective location in which there are such sensing and/or monitoring devices. As the manager/coordinator wireless communication device enters within sufficient proximity such that wireless communication may be supported with the different respective sensing and/or monitoring devices, information related to such monitoring and/or sensing functions may be provided to the manager/ordinate wireless communication device.

While various respective and exemplary embodiments have been provided here for illustration to the reader, it is noted that such applications are non-exhaustive and that any of a variety of application contexts may be implemented such that one or more wireless communication devices are implemented throughout an area such that those one or more wireless communication devices may only occasionally provide information to a manager/ordinate wireless communication device. Any such application or communication system may operate in accordance with the in accordance with various aspects, and their equivalents, of the invention.

Figure 17:
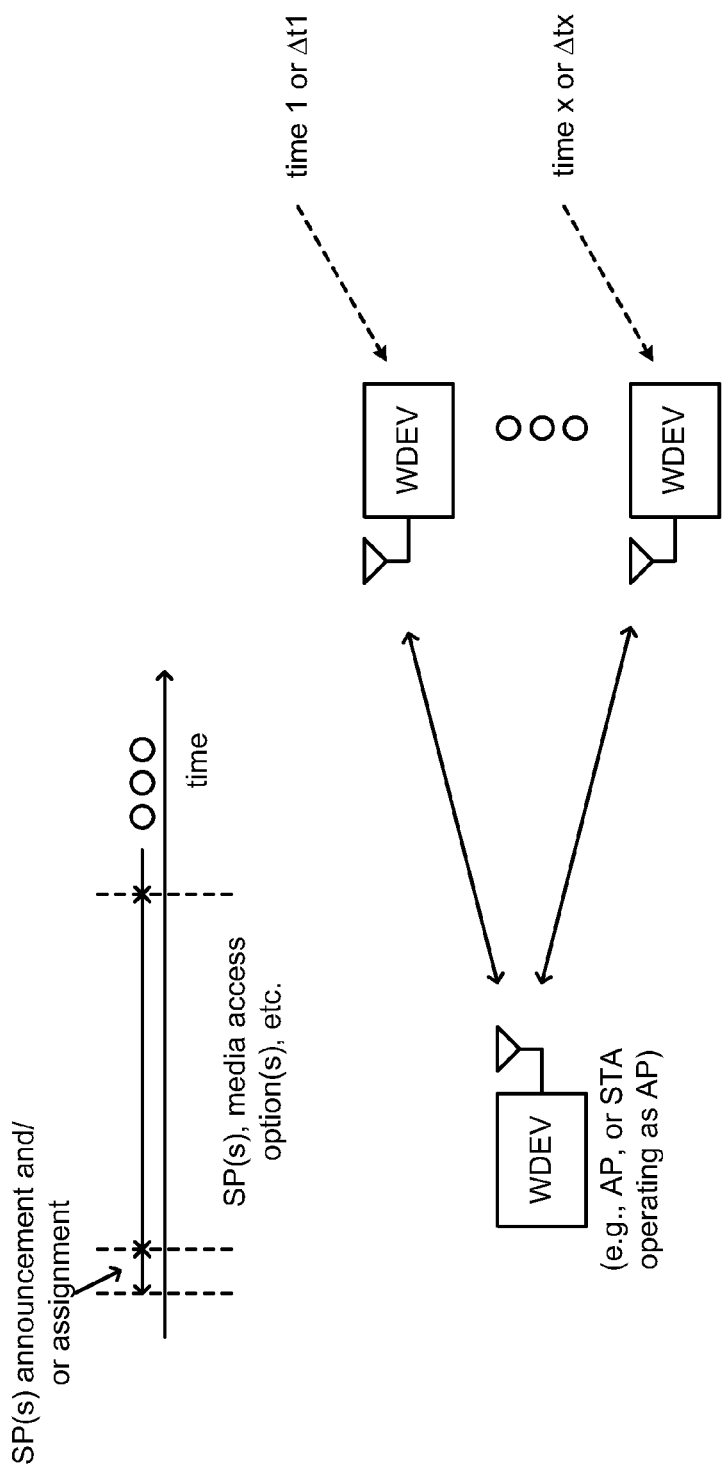
FIG. 17 illustrates an embodiment of a wireless communication system including a number of wireless communication devices therein.

FIG. 17 illustrates an embodiment 1700 of a wireless communication system including a number of wireless communication devices therein. As may be seen with respect to this diagram, one of the wireless communication devices (e.g., an AP, a STA operating as an AP, a manager/coordinator wireless communication device) operates by providing a service period (SP) announcement and/or assignment frame to other wireless communication devices within the wireless communication system. The time period in which the different respective wireless communication devices are provided access to the communication medium is divided into different respective and separate SPs. A given wireless communication device may only effectuate communication medium access during an SP in which it is authorized to do so.

Figure 18:
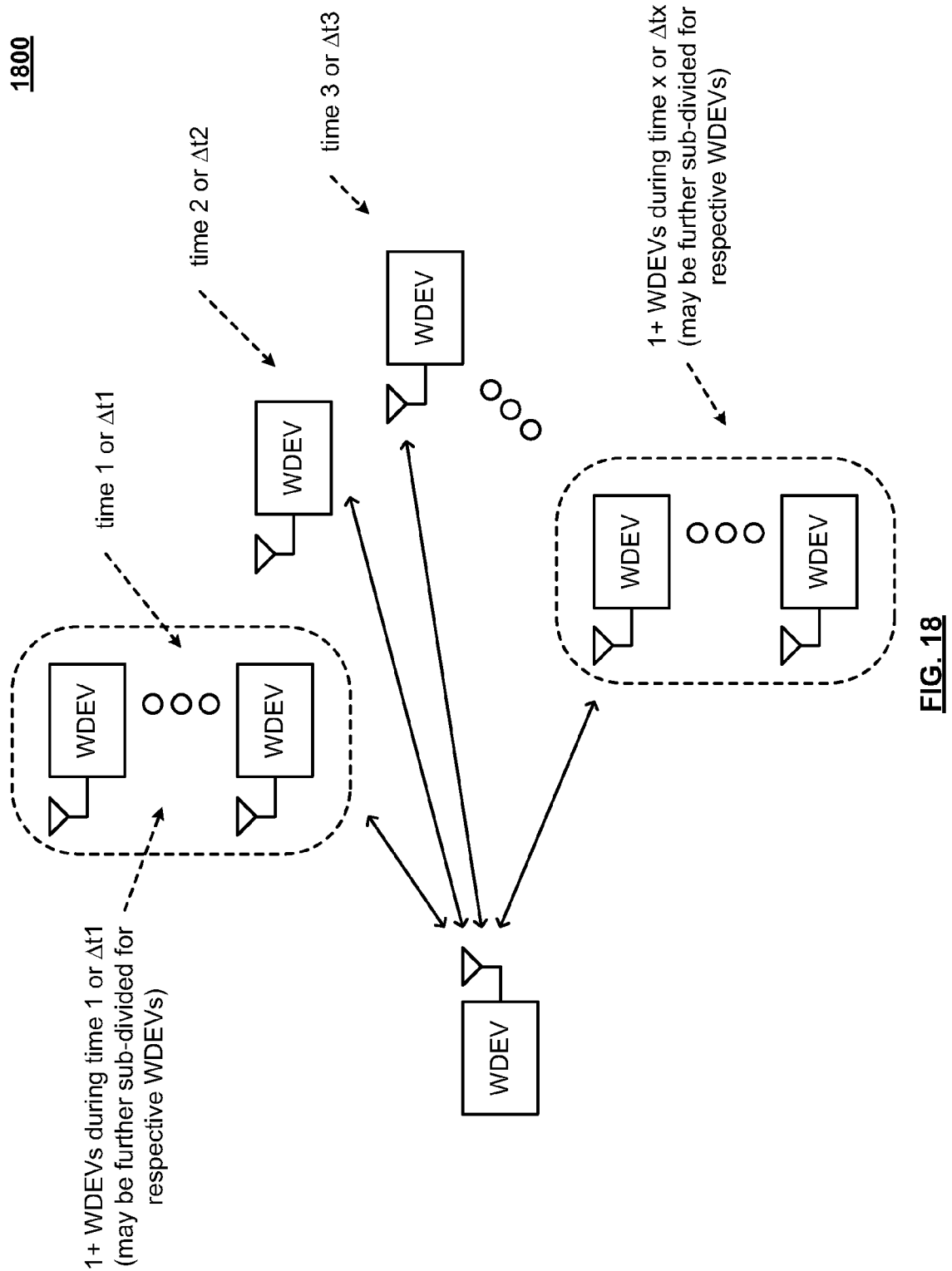
FIG. 18 illustrates an alternative embodiment of a wireless communication system including a number of wireless communication devices therein.

FIG. 18 illustrates an alternative embodiment 1800 of a wireless communication system including a number of wireless communication devices therein. It is also noted that the different respective wireless communication devices may be subdivided into a number of specific classes or groups that are permitted to transmit only during specific SPs. For example, there may be a first group of wireless communication devices (e.g., SMSTAs) that is permitted to transmit during a first SP, and a second group of wireless communication devices (e.g., STAs that are not specifically SMSTAs) is permitted to transmit during a second SP, etc.

A given wireless communication device of a particular class that is not given explicit permission to transmit within a specific SP is not allowed to transmit during that SP. However, it is noted that the one of the wireless communication devices (e.g., an AP, a STA operating as an AP, a manager/coordinator wireless communication device) may provide certain exceptions for one or more of the respective wireless communication devices. For example, an exception announcement may be transmitted from that one of the wireless communication devices to other of the wireless communication devices.

In accordance with such classification and/or grouping of the different respective wireless communication devices, it is noted that certain classes and/or groups may be assigned to more than one specific SP. For example, wireless communication devices of a given class and/or group may be permitted to perform transmission during multiple respective SPs. Also, more than one class and/or group may be assigned to any given SP, such that wireless communication devices associated with a first class/group as well as wireless communication devices associated with a second class/group may all be permitted to perform transmission during a given SP.

A special SP may be created for beacon transmission from the one of the wireless communication devices (e.g., an AP, a STA operating as an AP, a manager/coordinator wireless communication device) to the other wireless communication devices. For example, such a beacon transmission SP may be provided to ensure that there is no permission for any class of other wireless communication devices to operate during a given one or more time periods. Alternatively, the one of the wireless communication devices (e.g., an AP, a STA operating as an AP, a manager/coordinator wireless communication device) may also allow some classes and/or groups to operate within the time period associated with the beacon transmission related SP.

As the reader will understand, given that a number of different respective wireless communication devices are all operative within a wireless communication system and may not all be temporally synchronized to the same clock, there may be some differentiation with respect to the timing and clock accuracy within the different respective wireless communication devices. As such, the one of the wireless communication devices (e.g., an AP, a STA operating as an AP, a manager/coordinator wireless communication device) will serve as the reference by which SP timing is effectuated among the respective wireless communication devices. That is to say, each of the other respective wireless communication devices will maintain a local clock that is synchronized to the reference clock within or maintained by the one of the wireless communication devices (e.g., an AP, a STA operating as an AP, a manager/coordinator wireless communication device), such as in accordance with the timing synchronization function (TSF) as specified in accordance with IEEE 802.11 WLAN operation, or in accordance with some other clock having an acceptable (usually high) accuracy. However, it is also noted that certain of the wireless communication devices may be exempt from maintaining synchronization to this main/master clock within or maintained by the one of the wireless communication devices (e.g., an AP, a STA operating as an AP, a manager/coordinator wireless communication device). For example, certain of the wireless communication devices may enter into relatively long periods of sleep, and such operation may prevent the respective ability to maintain synchronization with this main/master clock.

Figure 19:
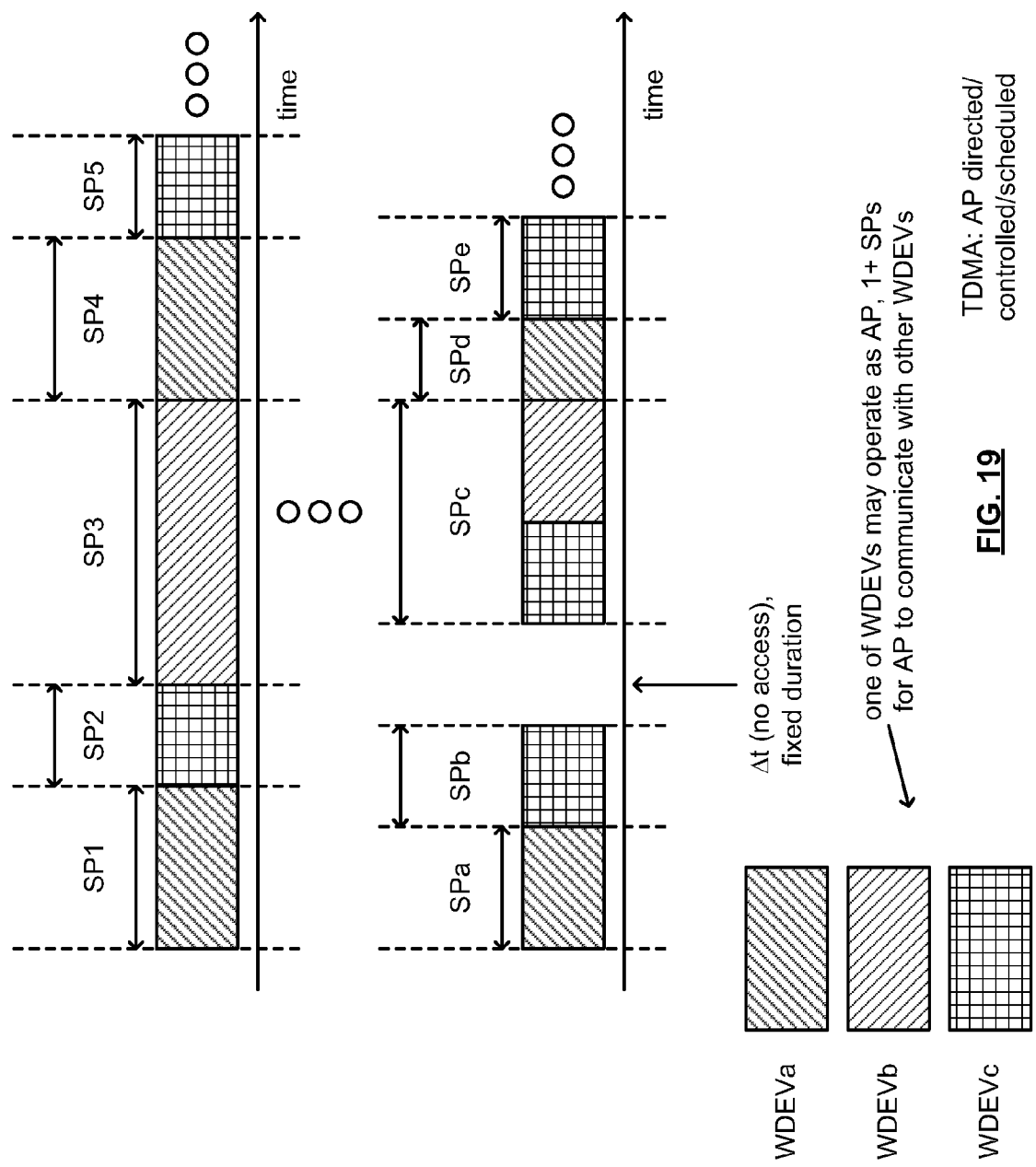
FIG. 19 illustrates an embodiment of time division multiple access (TDMA) operation, as may be effectuated at a media access control (MAC) layer, within various wireless communication devices.

FIG. 19 illustrates an embodiment 1900 of time division multiple access (TDMA) operation, as may be effectuated at a media access control (MAC) layer, within various wireless communication devices. This diagram pictorially shows, as a function of time, how different respective wireless communication devices are provided access to the communication medium. Any of a number of different schedules may be employed to provide for access by the various wireless communication devices (e.g., as shown by various respective TDMA options shown at the top and middle/bottom of the diagram as separated by the ellipsis). It is noted that the respective time periods in which the wireless communication devices are provided access to the communication medium need not be uniform in length. Different respective time periods of different respective durations may be provided for different respective wireless communication devices.

Referring to the diagram, it may be seen that those wireless communication devices having the characteristic associated with type "a" are provided the opportunity to have access to the communication system during those respective hashed portions (lines extending from lower left to upper right) along the respective time axis, those wireless communication devices having the characteristic associated with type "b" are provided the opportunity to have access to the communication system during those respective hashed portions (lines extending from upper left to lower right) along the respective time axis, and those wireless communication devices having the characteristic associated with type "c" are provided the opportunity to have access to the communication system during those respective hashed portions (lines extending both vertically and horizontally) along the respective time axis.

In other words, different respective service periods (SPs) are provided so that wireless communication devices associated with different classes and/or groups may be provided access to the communication medium during those respective times.

Figure 20:
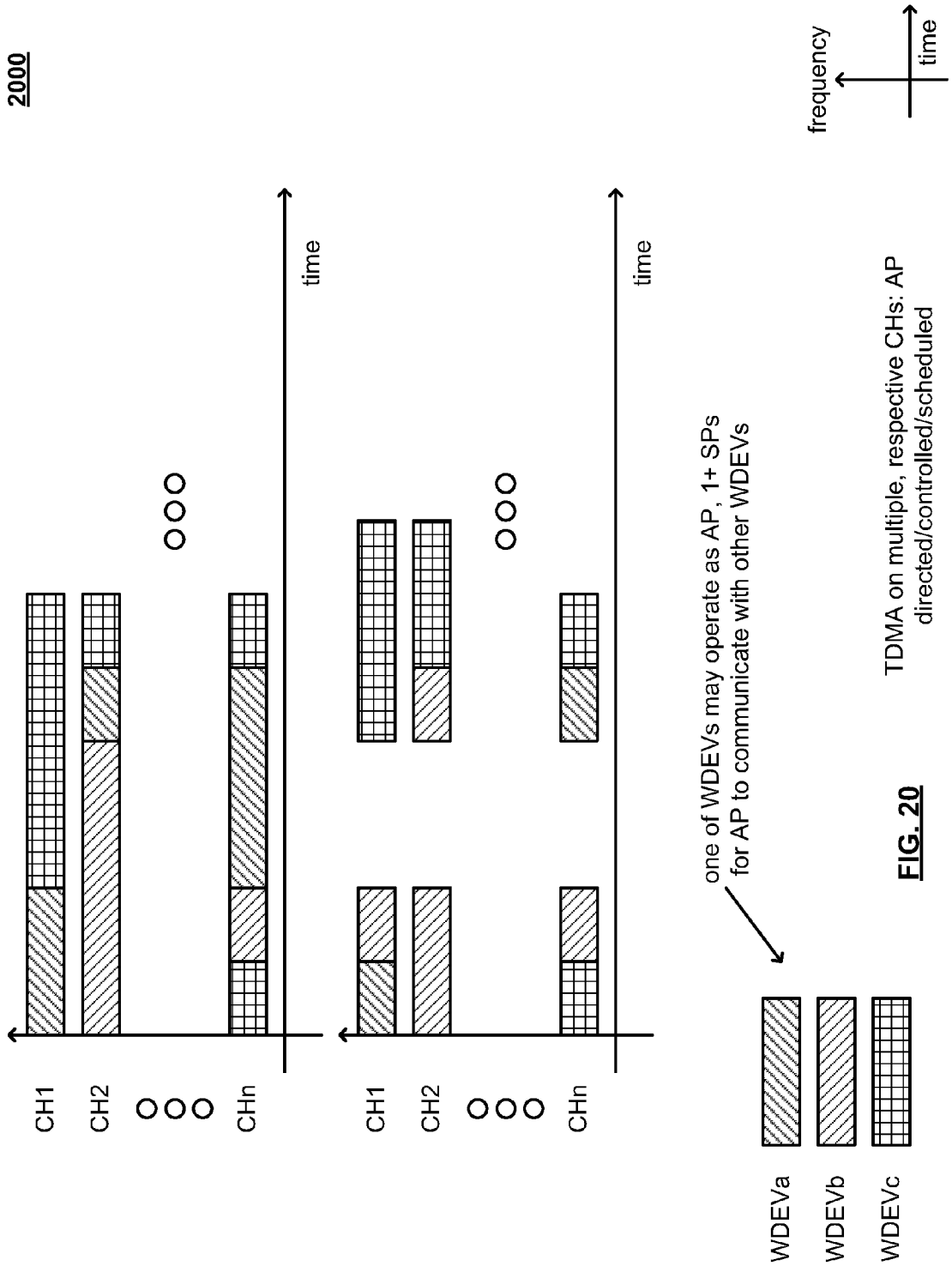
FIG. 20 illustrates an embodiment of TDMA operation on multiple, respective frequencies, spectra thereof, channels, and/or clusters, as may be effectuated at a MAC layer, within various wireless communication devices.

FIG. 20 illustrates an embodiment 2000 of TDMA operation on multiple, respective frequencies, spectra thereof, channels, and/or clusters, as may be effectuated at a MAC layer, within various wireless communication devices. This diagram has some similarities to the previous embodiment 1900 and FIG. 19, with at least one difference being that frequency diversity is also employed in conjunction with temporal diversity. That is to say, TDMA signaling may be effectuated on a number of different respective channels (and/or clusters, etc.).

In accordance with such operations and principles as described herein, it is noted that there may be one or more respective dedicated SPs that are used for a given class/group of wireless communication devices. For example, a new STA may associate or disassociate during certain of the SPs. As one example, an AP may specify which of the SPs can be used for a new STA to send an association requests. Such information may be provided from the AP within a beacon or some other type of frame, such as a probe response frame, or a management frame.

Also, during some SPs, a different preamble may be used. For example, to reduce implementation complexity, different classes of preambles may be employed such as may be employed in accordance with the currently developing IEEE 802.11ah standard in which a first type of preamble may be employed in accordance with normal range operations while a second type of preamble may be employed in accordance with extended range operations. In such communication system applications in which more than one preamble is employed, having a separate and respective SP for operation using only one of those types of preambles may serve to allow STAs to be implemented and operative in accordance with only one of those types of preambles. For example, provided that an STA is allowed to operate only during one or more specific SPs, then such an STA need not necessarily have capability to accommodate multiple respective preamble types.

Also, in an effort to save time, extra preamble processing may be avoided on those relatively low power STAs when possible. For example, one type of preamble may be relatively shorter than another type of preamble, and avoiding operation on a relatively longer type of preamble may save time, energy, etc. Also, in an effort to save overhead, a relatively longer preamble type may be avoided when needed. For example, in the situation that one type of preamble may be relatively shorter than another type of preamble, operation that would require all of the STAs to use a shorter type of preamble during specific SPs could potentially increase efficiency of operation in those respective SPs. For example, in operation in communication systems in which certain of the wireless communication devices may be operative in accordance with IEEE 802.11n and/or IEEE 802.11ac, such as in accordance with mixed mode operation such that some of the wireless communication devices are operative in accordance with one standard, other of the wireless communication devices are operative in accordance with the other standard, and certain of the wireless communication devices may be operative in accordance with both of the standards, such a mixed mode preamble may be relatively longer than a Greenfield preamble, and overhead associated with the preamble may be reduced.

Moreover, with respect to certain applications that may require little and/or no latency (e.g., such as those related to voice, video, and/or other real-time interactive communications), the latency associated for such traffic may be implemented to be less than some particular threshold (e.g., less than T milliseconds). Providing specific TDMA SPs may be used to help minimize such latency and reduce jitter within such applications. For example, voice traffic may be provided with its own respective SP because it has the strictest latency requirements in accordance with such a real-time, bidirectional, and interactive communication application. Voice traffic need not be constrained to a single type of SP, however. For example, if the aggregated duration of non-voice over Internet protocol (VoIP) SPs would be more than some predefined threshold, then voice traffic can be assigned to one or more additional SPs. Such operations and considerations may also be performed with respect to video applications as well.

For example, an AP may allow for transmissions associated with voice, video, etc. in any given SP as desired or that may be acceptable for such voice, video, etc. applications. During those respective SPs that can be used for voice, video, etc. applications, the voice, video, etc. content therein may be given priority over other traffic in the SP if it is deemed necessary. For example, because of the inherently aggressive latency requirements associated with voice, video, etc. applications, content respectively associated therewith may be given priority over other types of content.

With respect to synchronization of SPs, it is noted that the timing synchronization function (TSF) as specified in accordance with IEEE 802.11 WLAN operation, or in accordance with some other clock having an acceptable (usually high) accuracy, may be used as a reference to specify the beginning of each respective SP. As the reader will understand, with respect to highly diverse wireless communications systems in which a number of different wireless communication devices are implemented therein, including some of those that may be battery operated, have relatively inaccurate clocks, and/or some other operational limitations, synchronization may be challenging. Moreover, with respect to certain of the wireless communication devices that may enter into relatively long sleep periods, synchronization may also be challenging, in that, upon entering into an awakening from different respective sleep periods, there may be inaccuracy incurred or introduced with the internal timing and clocks therein.

As may be understood within such applications, some of the wireless communication devices may go to sleep for a relatively long period of time after having been awake and operational. As such, those respective wireless communication devices may not necessarily receive a beacon for a relatively long period of time. The TSF may not be an adequate, acceptable, or valid reference for certain of the SPs if the TSF has not been synchronized for a relatively long period of time (e.g., Y second(s)). As such, for those wireless communication devices in which timing and/or synchronization may be or potentially may be problematic, such as low power (LP) STAs, the TSF may be integrated and/or included within communications such as data exchanges between an AP and those respective STAs that may wake up relatively less frequently to receive beacons for the purpose of synchronizing their respective internal timers. That is to say, certain information such as TSF may be piggy-backed onto or included within communications to those respective wireless communication devices. Also, some of the LP STAs may contend for communication medium access during other SPs. For example, a given wireless communication device's respective TSF timer may be off by more than a certain amount (e.g., such as a threshold, such as more than N msec after sleeping for S seconds). In addition, if desired within a particular embodiment, such LP STAs may be allowed to contend for access to the communication medium at all times, instead of within the bounds of any specific SP or SPs, as such LP STAs may not be able readily to discern the respective boundaries of the SPs for any of a number of reasons including a potentially less than fully accurate internal clock, the fact that they are asleep for relatively long periods of time, the fact that they get out of synchronization with respect to the main/master clock to which the other wireless communication devices are synchronized, etc.

In addition, with respect to operating in accordance with TDMA signaling, and given the consideration that different respective wireless communication devices will operate using different respective internal clocks (e.g., oftentimes based upon an internal operating crystal), even though there may be certain synchronization operations that will attempt to minimize the lack of synchronization between different respective devices, in a real world application, there may unfortunately be certain differences, inaccuracies, etc. between the different respective clocks of the different respective devices. For example, crystals used for wireless communication devices (e.g., STAs) within the context of a WLAN can have an accuracy specified in a certain amount of parts per million (e.g., X ppm). The accuracy of such a crystal employed within a given wireless communication device results in a variance of the local TSF clock that is used in that particular wireless communication device as a reference for the beginning of each respective SP. Those wireless communication devices that are not specifically designated or operative as being low power (e.g., non-LP STAs) may be able to correct their respective TSF timers by using information received from a manager/coordinator wireless communication device (e.g., an AP, STA operating as an AP, etc.), such as may be received in beacons from such a manager/coordinator wireless communication device. If a given wireless communication device is not able to receive, process, etc. some number of certain respective beacons (e.g., because it has been sleeping, is asleep, is at less than a full functionality state, etc.) that respective wireless communication device may not be able to correct for error with respect to timing references before the error accumulates to a significant and unmanageable size (e.g., the difference in timing and/or error being beyond what can be easily corrected).

Considering an illustrative example, if T is the amount of time that a wireless communication device has been asleep, then that particular wireless communication device can have as much as an error of $E=T \times X \times 10^{-6}$ in its respective TSF clock when it awakes (e.g., considering T being the amount of time that the wireless communication device is asleep, X being the accuracy specified in ppm, and E being the error). As an even more detailed example, by assigning values to these respective variables, T=7200 seconds (two hours), X=20, then the associated error, E, will be approximately 150 ms.

Generally speaking, the respective boundaries associated with an SP are expected to have a tolerance of less than a relatively small amount (e.g., approximately 0.1 ms). In order to allow for correction of the TSF timer in a wireless communication device (e.g., an LP STA) without requiring a particular wireless communication device to wait to receive a beacon, the TSF timer may be embedded in one or more response frames sent from a manager/coordinator wireless communication device (e.g., an AP, STA operating as an AP, etc.) to any of the other wireless communication devices within the wireless communication system (e.g., the STAs within the system, BSS, etc.). In addition, while it is noted that certain timing related information, including TSF timer related information, may be included within beacons that are transmitted from one wireless communication device to other wireless communication devices, it is noted that any desired additional frames (e.g., not specifically beacons) may alternatively or also include such timing related information, including TSF timer related information, and may be sent by anyone of the wireless communication devices (e.g., the manager/coordinator wireless communication device or any of the other wireless communication devices, including any STA) to provide for additional or frequent timing information to allow a given wireless communication device (e.g., an awakening STA) the opportunity to synchronize its respective clock without specifically having to wait for the arrival of a beacon.

Also, to avoid the possibility of a wireless communication device transmitting outside of an SP designated for that particular wireless communication device, that wireless communication device may schedule a respective wake-up time closer towards the middle of an SP. As may be understood, because of the potentiality of relatively inaccurate timing in regards to the internal timing reference of a given wireless communication device, by scheduling a wake-up time to be further away from the respective edges of an SP, there would be less of a likelihood that a given wireless communication device would awaken and begin a transmission at an SP edge/boundary.

Also, referring again to the variables employed above, where E being an associated error, if it is determined that E>P×Tdur (where Tdur is the duration of a particular SP), and also where P<½, then TDMA signaling may not be the best solution or appropriate for a given wireless communication device (e.g., a STA). For example, if a STA is specifically an LP STA, then that particular STA might not wake up for synchronization to contain the timing error below a particular value, namely, below the value of P×Tdur. Also, those STAs which may not specifically be LP STAs, but may alternatively be referred to as medium power low data rate STAs (MPLD STAs), maybe operative to wake up occasionally to receive beacons and maintain timing accuracy. For example, even if such MPLD STAs do not necessarily stay asleep or inactive for periods of time that are sufficiently long enough to cause a TSF tracking error exceeding some threshold (e.g., 0.1 ms), such wireless communication devices may nonetheless wake up to receive beacons and maintain sufficient or acceptable timing accuracy. Stated another way, if the internal clock of a given wireless communication device cannot maintain accuracy sufficiently well (e.g., such as with at least one half of the accuracy of the manager/coordinator wireless communication device), then TDMA signaling may potentially not be the best or preferred implementation for such an embodiment. Analogously, for those wireless communication devices that stay asleep for such a long period of time that maintaining timing synchronization even within such a relatively generous constraint as described above, an alternative implementation to TDMA signaling may be preferred.

Figure 21:
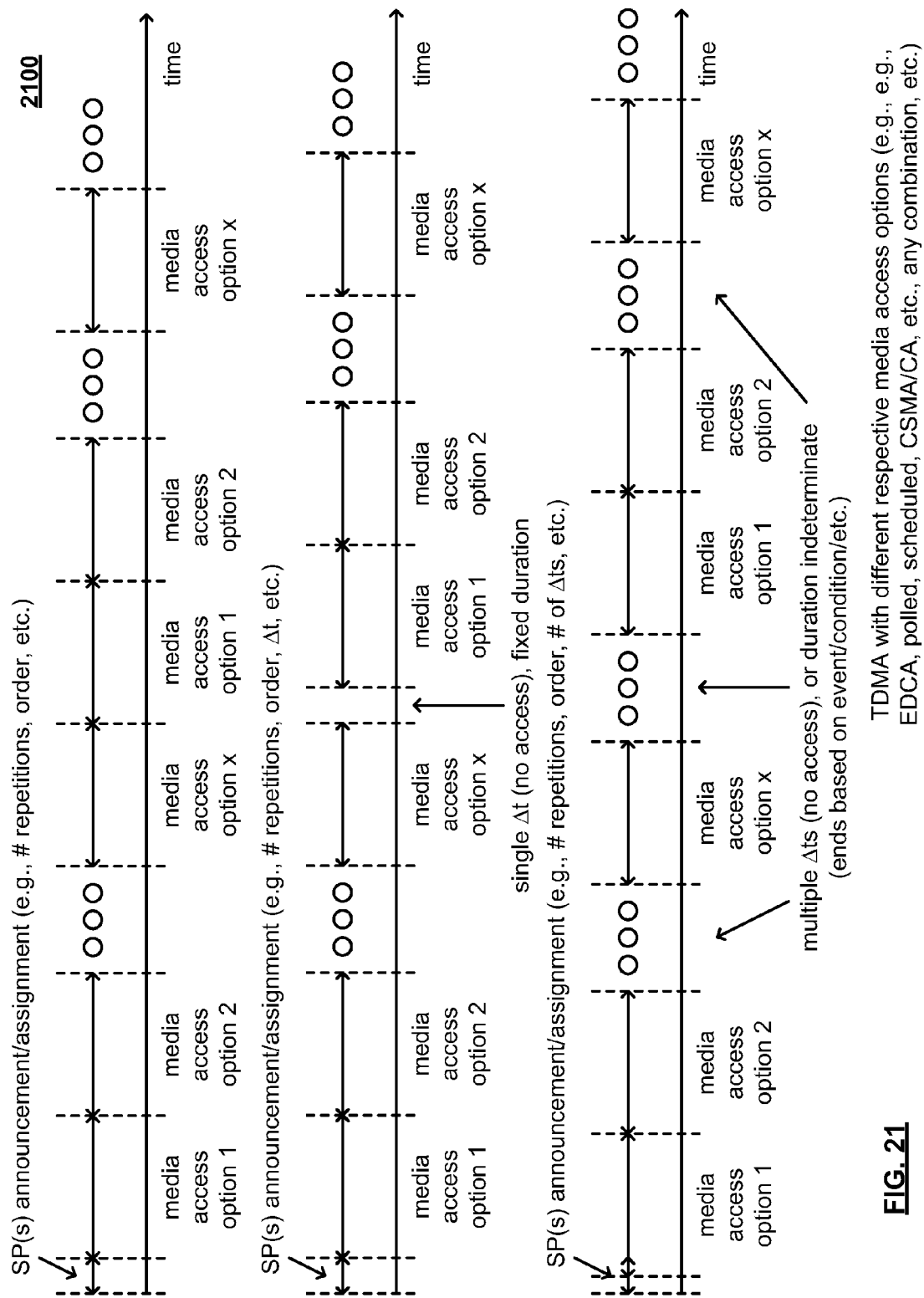
FIG. 21 illustrates an embodiment of multiple service periods (SPs) for use in various wireless communication devices within a wireless communication system.

FIG. 21 illustrates an embodiment 2100 of multiple service periods (SPs) for use in various wireless communication devices within a wireless communication system. As can be seen with respect to this diagram, a given SP announcement/assignment may be provided to direct operation for a relatively long subsequent period of time, in which different communication medium access options may be employed (e.g., enhanced distributed channel access (EDCA), polled, scheduled, carrier sense multiple access/collision avoidance (CSMA/CA), etc. and/or any combination thereof, etc.) during different respective periods of time.

For example, at the top of the diagram, a given announcement/assignment frame is provided (e.g., from a manager/coordinator wireless communication device) to a number of other wireless communication devices that specifies the different respective medium access options that are performed sequentially over a period of time, and the pattern is repeated. That is to say, the SP instances, which may be determined by a manager/coordinator wireless communication device (e.g., an AP), may be periodic in certain instances. The announcement/assignment may include the number of times in which the overall pattern is repeated, the respective order of the different respective medium access options performed, and/or other characteristics associated with such periodicity, etc.

As may be seen with respect to the middle of the diagram, there may be a given time period in which there is no communication medium access allowed by any of the respective wireless communication devices. Also, as may be seen with respect to the bottom the diagram, the may be multiple respective time periods in which there is no communication medium access allowed by any of the respective wireless communication devices.

Figure 22:
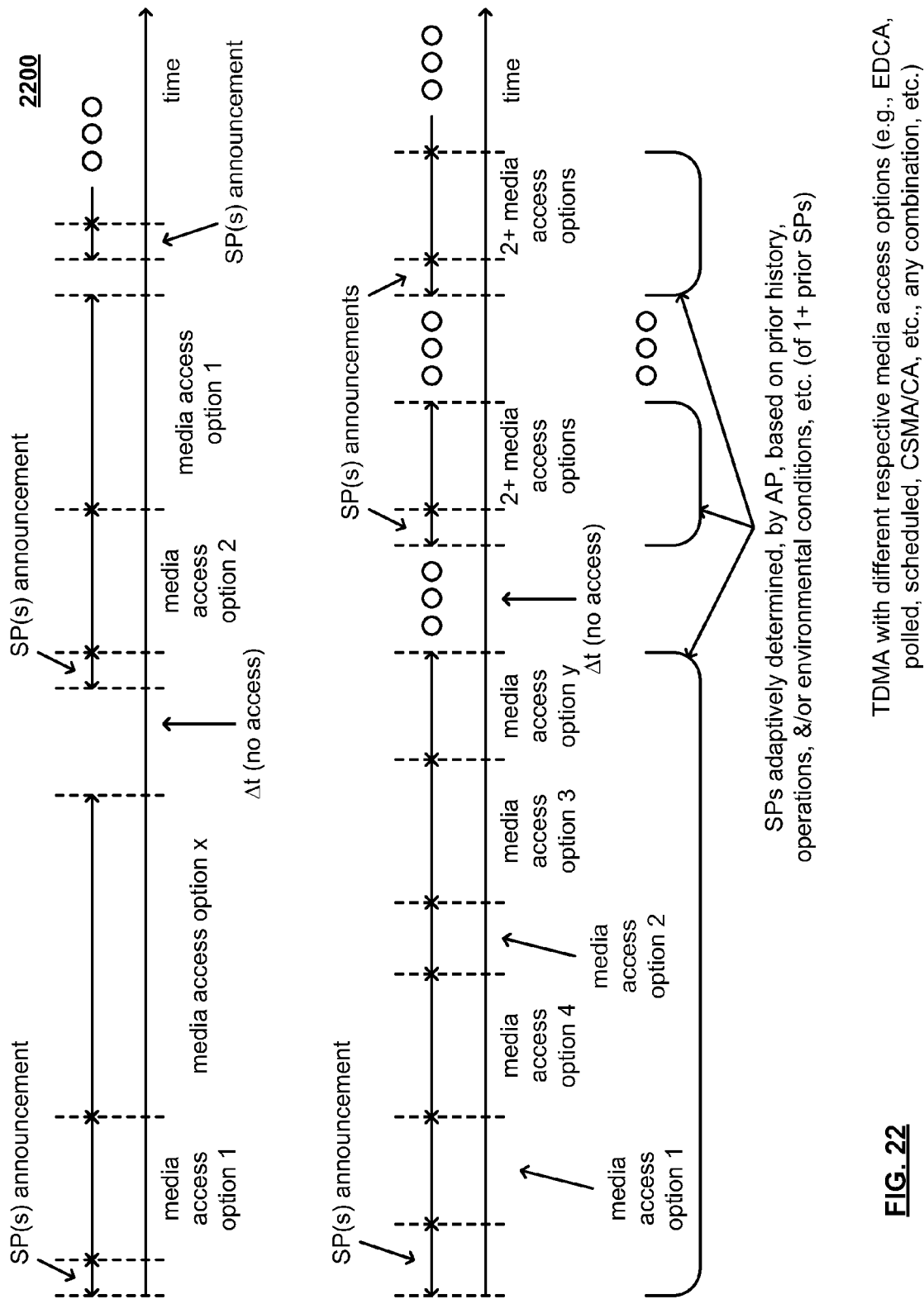
FIG. 22 illustrates an alternative embodiment of multiple SPs for use in various wireless communication devices within a wireless communication system.

FIG. 22 illustrates an alternative embodiment 2200 of multiple SPs for use in various wireless communication devices within a wireless communication system. As can be seen with respect to this diagram, there may be great variability and variation between different respective SP announcements. For example, a first SP announcement may indicate a first one or more communication medium access options to be performed thereafter. A second SP announcement may indicate a second one or more communication medium access options to be performed thereafter. Different respective SP announcements may also include one or more common communication medium access options. As also described respect other embodiments and/or diagrams herein, a given SP announcement may be adaptively generated based upon prior history, operations, and/or environmental conditions, etc. such as with respect to one or more other prior SPs. That is to say, such SP announcement may be adaptively determined based upon any one or more prior considerations.

Generally speaking, each respective SP may be described within an SP announcement and/or assignment that is provided from one of the wireless communication devices within the wireless communication system (e.g., a manager/coordinator wireless communication device, AP, STA operating as an AP, etc.). As may be seen with respect to this diagram, such an SP announcement may be periodic. Also, such an SP announcement may be done through any of a variety of different types of frames transmitted from a wireless communication device (e.g., beacons, regularly transmitted frames including data frames, management frames, acknowledgment frames, probe responses, etc.). Also, it is noted that while certain embodiments operate by providing respective SP announcements somewhat regularly (e.g., periodically, in accordance with a uniform time base, etc.), alternative embodiments envision providing such SP announcements at other respective times then periodically (e.g., providing such SP announcements at non-specified/non-uniform/non-periodic times, such as may be made in accordance with certain events, conditions, actions, etc.).

Among the various amount of information that may be included within various embodiments of an SP announcement frame, a given embodiment of an SP announcement frame may include those particular wireless communication devices which are allowed and disallowed users of one or more SPs that are described or correspond to a given SP announcement frame. For example, in certain embodiments, an association ID (AID) (e.g., a shortened, but unique substitute for a full 48 bit MAC address allowed and/or disallowed from operating in the SP). For example, an AID may be viewed as being a one-to-one mapping of the full 48 bit MAC address to a relatively shorter bit address, such as 11 bits, that is unique within the BSS). That is to say, within a given BSS, a manager/coordinator wireless communication device (e.g., AP) can assign the respective AIDs to the respective wireless communication devices therein.

With respect to categorization of those wireless communication devices which may be allowed and/or disallowed from operating within a respective SP, the definition of an entire class may be made and such information may be provided within an SP announcement frame. For example, different types of wireless communication devices may be categorized within one or more classes based on their respective needs and/or characteristics. For example, based on any of a number of considerations including the frequency of transmission of a given wireless communication device, the bandwidth requirements needed (e.g., sensor and/or monitoring devices/STAs may require relatively lower bandwidth than other devices/STAs), the traffic patterns associated therewith, the frame format capabilities, quality of service (QoS)/latency limits for different respective streams (e.g., including their relative QoS/latency limits such as for different types including voice, video, data, etc.), existence of dedicated traffic streams to be delivered by or to a particular wireless communication device, etc., the different respective wireless communication devices may be categorized into one or more allowed classes and disallowed classes.

Also, it is noted that, within a given BSS, there may be different respective wireless communication devices having mixed capabilities (e.g., IEEE 802.11n, IEEE 802.11ac, IEEE 802.11ah [currently under development], and/or any other combination of such IEEE 802.11x functionality sets, etc.). In certain situations, there may be different respective preamble types employed, such as a first preamble type corresponding to normal or typical operations (e.g., relatively high throughput as may be associated with a handset, laptop, etc.) and a second preamble type corresponding to another application type (e.g., below noise acquisition, having a relatively longer preamble, such as may be employed for sensing and/or monitoring applications). Operation in accordance with a given SP may specify that those respective wireless communication devices operating within that SP must operate within a particular operational mode (e.g., in accordance with an extended range mode of operation or in accordance with normal mode of operation).

Also, with respect to the categorization and classification of the respective wireless communication devices as operating within a given SP, one or more of the classes may be determined by any one of the wireless communication devices (e.g., not necessarily only by a manager/coordinator wireless communication device, such as an AP). If desired, such categorization and classification of the respective wireless communication devices may be performed in a cooperative manner, such that one or more of the wireless communication devices within the wireless communication system provides certain classification, and that classification is negotiated and ultimately approved by a manager/coordinator wireless communication device, such as an AP. In even other embodiments, such classification may be performed during association by a manager/coordinator wireless communication device, such as an AP. These respective class assignments may be made in the manner that allows for the spacing of potential transmitters sufficiently far apart from one another in time (e.g., respective transmission from the various communication devices being sufficiently temporally separated) as to reduce a probability of collisions from the respective wireless communication devices. Also, the categorization of the respective wireless communication devices into one or more different respective groups may be achieved in accordance with group ID related operations, as described in one of the U.S. utility patent applications incorporated by reference above. For example, a group of wireless communication devices may be specified and identified in a separate exchange, and those wireless communication devices may be assigned to a specific group ID value. The use of such a group ID may be one possible means by which certain wireless communication devices may be specified and identified and allowed to operate during a particular SP.

Moreover, with respect to other characteristics associated with an SP announcement, the start of the SP may be associated with the clock of the transmitting wireless communication device from which the SP announcement was sent (e.g., a manager/coordinator wireless communication device, such as an AP) as a reference. As described with respect to certain embodiments and/or diagrams herein, such an SP announcement may indicate a periodicity of one or more subsequent SPs (if applicable), the duration of the one or more subsequent SPs, the respective allowed communication medium access options employed or allowed during the one or more subsequent SPs (or his subdivisions thereof) (e.g., enhanced distributed channel access (EDCA), polled, scheduled, carrier sense multiple access/collision avoidance (CSMA/CA), etc. and/or any combination thereof, etc.), whether or not any frame format types are allowed or disallowed, and/or any other desired information, etc. Also, and SP identifier may be included with any embodiment of an SP announcement that uniquely identifies an SP, a periodic set of SPs, an aperiodic set of SPs, etc. Generally, such an SP identifier, or SP identifiers, may be implemented in such a way that each respective SP identifier may be viewed as an index that corresponds to a number of parameters which may be defined elsewhere (e.g., within a lookup table, memory, chart, etc.).

Also, an SP announcement may be used as a mechanism to quiet the communication network during one or more given SPs for all other type of traffic therein. For example, an SP announcement may be used to provide information to those wireless communication devices not specified within a given SP regarding when those non-specified wireless communication devices are specifically not to transmit. That is to say, an SP announcement may include a description of the SP start, the periodicity thereof if any, the duration, one or more allowed classes, one or more disallowed classes, etc. and such information may be used by certain non-participating classes to determine when specifically they are not to transmit. Generally, if a wireless communication device not explicitly provided information regarding it being specifically allowed or disallowed, this additional information within an SP announcement may be used to deduce whether or not that wireless communication device can or cannot transmit during one or more SPs specified within an SP announcement.

Also, any number of frame exchanges may be used to quiet the communication network for other types of traffic during a given SP. As an example, a manager/coordinator wireless communication device, such as an AP, can send specific keep out messages to non-participating classes at the beginning of each respective SP. Such a manager/coordinator wireless communication device, such as an AP, may also announce an SP at the start of the SP within announcement transmission which immediately precedes the start of the SP. Such an announcement may include clock information that allows those wireless communication devices with relatively lower accuracy clocks (e.g., LP STAs) to synchronize their respective clocks. This announcement may also contain additional information such as an indication of which SP is starting and may also repeat any previously announced information about the SP as well (e.g. duration, one or more allowed classes, one or more disallowed classes, etc.).

As may be understood, such an announcement may operate to aid in the synchronization of clocks of the respective wireless communication devices, taking into account the inaccuracy of some of the clocks used by those wireless communication devices. That is to say, a wireless communication device employing a relatively lower accuracy clock may awaken earlier than necessary in order to ensure that the wireless communication devices awake at the start of the SP. That is to say, as described with respect to other embodiments and/or diagrams herein, if a given wireless communication device which is not particularly certain of the time (e.g., because of the relatively lower accuracy or potentially inaccurate clock), then that wireless communication device will not be certain of exactly when a given STB begins. By providing an AP announcement at the start of the SP, synchronization may be achieved for those wireless communication devices that are waiting and may also provide a definitive indication of the start of the SP. Also, if the SP is not expected to contain any wireless communication devices that do have or potentially have relatively lower accuracy or potentially inaccurate clocks (e.g., the SP may not include any LP STAs), then the manager/coordinator wireless communication device, such as an AP, may refrain from announcing the start of the SP in an effort to reduce overhead. That is to say, if there are not expected to be any wireless communication devices within the group that may have problems with respect to timing and synchronization, then a specific announcement at the start of an SP may not be necessary or desirable in such specific situations.

Also, such a manager/coordinator wireless communication device, such as an AP, may use a shortened form of such an announcement (e.g., employing such an announcement that contains only and SP identifier and a subset of the information that was contained in a previous SP announcement); again, such variations and operations may be employed in an effort to reduce overhead. By using or referencing information that was included in one or more prior SP announcements, overhead and information within a current SP announcement may be reduced.

With respect to the specific communication medium access options performed during each respective SP, or during each respective subdivision of an SP, any of a variety of different types of communication medium access may be employed, including enhanced distributed channel access (EDCA), polled, scheduled, carrier sense multiple access/collision avoidance (CSMA/CA), etc. and/or any combination thereof, etc.

For some particular classes of traffic, polling may be used during their respective SPs. For example, with respect to those wireless communication devices that may only occasionally or periodically operate as transmitters (e.g., those wireless communication devices performing monitoring and/or sensing operations, such as SMSTAs, etc.), a manager/coordinator wireless communication device, such as an AP, will know particularly when, or approximately when, those wireless communication devices should have new information to send (e.g., because of any periodicity in their respective operation), and the manager/coordinator wireless communication device, such as an AP, may then poll those respective wireless communication devices at or approximately at those times. It is also noted that all of the respective wireless communication devices need not necessarily be polled during a single SP, in that, some of the wireless communication devices may be polled only every N-th SP in a sequence of M periodically repeating SPs (e.g., every third SP, or every 10th SP, etc.).

Also, if a particular wireless communication device, such as a monitoring and/or sensing wireless communication device, does not respond to a poll within a certain period of time, then the manager/coordinator wireless communication device, such as an AP, can do any one of a number of different things. For example, the manager/coordinator wireless communication device may wait for a period of time and then try to poll that same non-responding wireless communication device again. Alternatively, the manager/coordinator wireless communication device may move on to and begin polling the next wireless communication device (e.g., the next monitoring and/or sensing wireless communication device) in the list. In addition, as also described with respect to other embodiments and/or diagrams herein, various respective communications may be employed to provide system clock information. In the context of performing such polling, to allow an awakening wireless communication device to determine if it has in fact awakened at the right time, a respective polling frame can include system clock information. In other words, a polling frame can be used as another means to synchronize the respective clocks of the respective wireless communication devices within the communication system. A polling frame, as well as any other frame communicated between wireless communication devices, may be used for clock synchronization purposes.

In an effort to minimize potentially wasted bandwidth during one or more SPs, different operations may be employed to reclaim unused SP time. In addition, some of the SPs may be terminated before their scheduled end by a manager/coordinator wireless communication device, such as an AP. Considering an exemplary situation, when allowed class of wireless communication devices has little or no traffic for a given SP, then that SP may be terminated before its scheduled end. Alternatively, other mechanisms may be used to end an SP before its scheduled time.

For example, with respect to an AP governed implementation, such as in which an AP is polling different respective STAs within the wireless communication system, a poll-based SP may be terminated by the AP when it determines or sees that it has decided not to poll any additional STAs. For example, considering that an SP is for a specific class and that an AP has already polled all members of the class, then the AP may terminate the SP early given that all of the respective members of the class have already been polled. Alternatively, such an AP may terminate the SP implicitly by polling a STA that is not specifically included within the class of that particular SP (e.g., a poll may be provided to a specific individual STA or to a group of STA's or to a class of STA's that were not members of the one or more classes specifically allowed for that given AP). Alternatively, an SP may be ended early by an AP that transmits a packet indicating that other STA's may use the remainder of the SP. That is to say, other classes, other groups, other individual STA's, etc. may be permitted to use the remainder of the SP after receiving the packet that indicates that they may do so.

Considering another embodiment, with respect to a scheduled SP implementation, such as in which an AP has previously arranged schedules for STA's to exchange traffic within a given SP, then a STA may indicate during its respective SP that it does not have any traffic associated with a specific STA or for all STA's for the current SP and/or one or more subsequently scheduled SP's. In response, such a manager/coordinator wireless communication devices, such as an AP, may receive an indication from an STA to end an SP earlier than scheduled in order to reclaim the unused portion of the SP for use by other STA's, as described above.

In accordance with such operations as may be employed to identify and reclaim unused time within SP, certain considerations may be performed particularly when operating in accordance with an SP that uses an EDCA mechanism. For example, an EDCA based SP-termination mechanism may be implemented to start with and "intent to compete" signal (e.g., such as in accordance with intending to compete for access to the communication medium) within a specified window that occurs at the beginning of the SP. Such an intent to compete signal may be transmitted by any wireless communication device (e.g., STA) that is eligible and willing to compete for communication access during the SP. The intent to compete maybe implemented such that it is recognizably different from other transmitted signals and very short in time duration (e.g. one or two OFDM symbols). If a manager/coordinator wireless communication device, such as an AP, detects any intent to compete signal, then the manager/coordinator wireless communication device may be implemented to repeat the intent to compete after the end of the specified window to indicate to all members of the BSS that the SP will be used. For example, there may be certain wireless communication devices within the system that are unable to hear the intent to compete signal that is provided from another one of the wireless communication devices, but the manager/coordinator wireless communication device will most likely be able to hear the intent to compete signal, and that intent to meet signal may be forwarded on to the other wireless communication devices. The absence of an intent to compete signal during the window or in the time allotted for the manager/coordinator wireless communication devices (e.g., AP) to repeat the indication immediately after the window allows other class wireless communication devices (e.g., STAs) to determine if the SP will be used.

In an alternative embodiment, such a manager/coordinator wireless communication device, such as an AP, may be implemented to direct the reuse of certain remaining portions of an SP. For example, if an AP detects an idle period, and if the duration of such an idle period exceeds some threshold, then the AP may ask the other wireless communication devices (e.g., STAs) if they desire to use that remaining idle period of SP. For example, within an SP, the AP may be implemented to look for and detect and an IDLE period having the characteristics such that the IDLE period>(CWMAX+1)*SLOTTIME+AIFS (CWMAX for the class(es) given permission to operate within the SP).

If the required minimum IDLE is detected, then the AP may be implemented to send a "Permission to use" message to the other wireless communication devices within the system. Such permission to use the remaining portion of an SP may be individually sent to respective wireless communication devices, sent in accordance with BCAST, and/or sent specifically to any class or group or subclass, etc. If desired, the AP itself may be implemented to choose to use any unused time within SP specifically for itself (e.g., to the exclusion of other wireless communication devices within the system). It is noted that CWMAX can be different for each different class (e.g., a first class having a first CWMAX, a second class having a second CWMAX, etc., and those respective values may be adaptively adjusted and/or determined).

In addition, an AP can choose to share the SP earlier rather than after (CWMAX+1)*SLOTTIME+AIFS of IDLE time.

For example, if there is an overlapping BSS that has scheduled the time of this SP for some other purpose that overlaps with this SP, then the medium might not become IDLE for (CWMAX+1)*SLOTTIME. The service period may not be terminated earlier than some predetermined time (e.g., X microseconds/μsec) The value X μsec may be calculated based on the accuracy of the crystal and the maximum time that a user of each class can go to sleep and not receive the beacon or other packets for synchronization. In addition, the value of X μsec may be tailored specifically for those wireless communication devices that may have relatively lower accuracy or inaccurate clocks. For example, in certain embodiments, the largest value that may be used for value X μsec may be specifically tailored to be approximately ½ of that duration of an SP (e.g., particularly for those wireless communication devices having relatively lower accuracy or inaccurate clocks). In addition, different respective values of X may be employed for different respective classes or groups of wireless communication devices (e.g., a first class or device having a first X, a second class or device having a second X, etc., and those respective values may be adaptively adjusted and/or determined).

Figure 23:
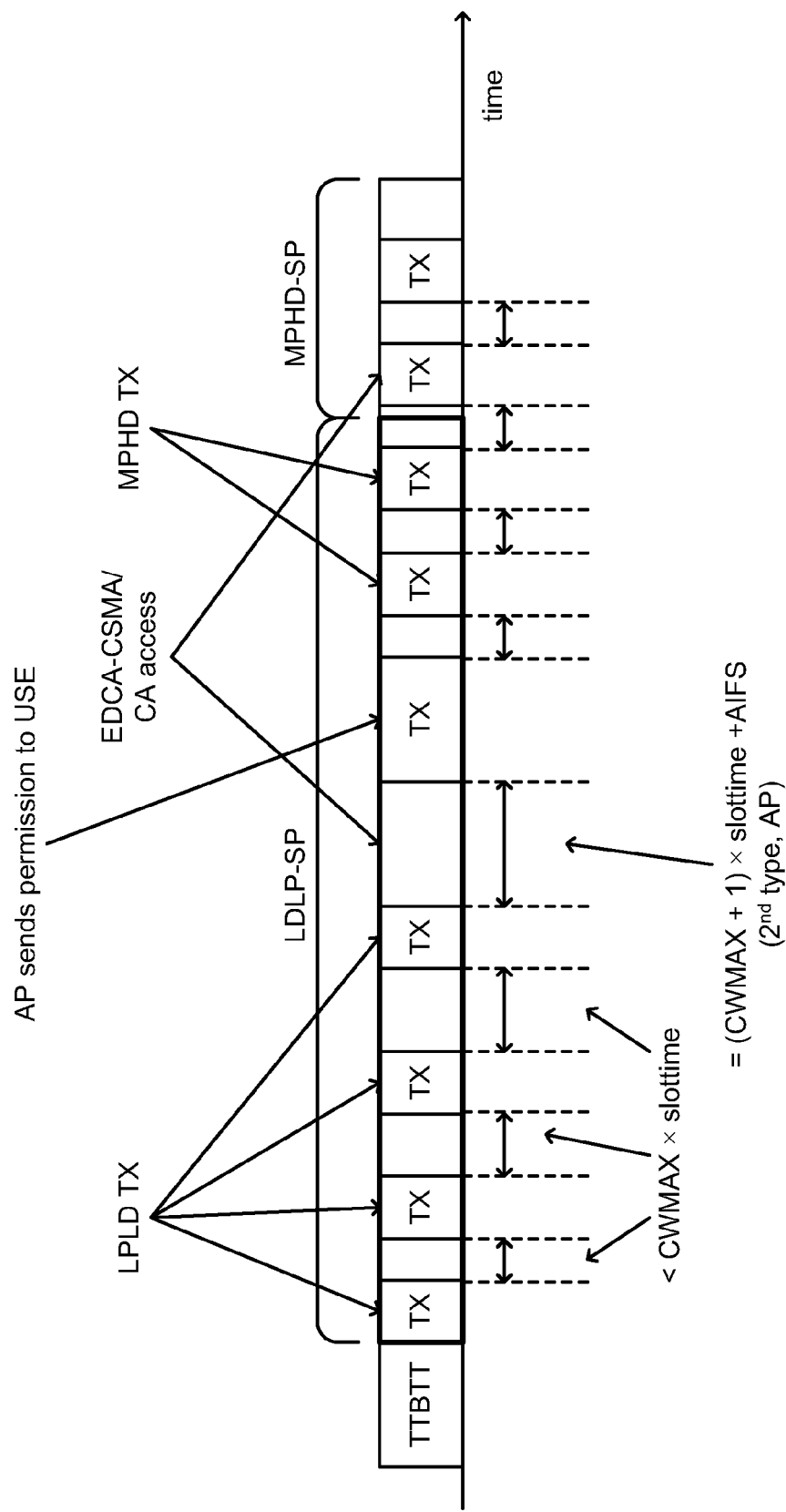
FIG. 23 illustrates an embodiment of TDMA termination for various wireless communication devices within a wireless communication system.

FIG. 23 illustrates an embodiment 2300 of TDMA termination for various wireless communication devices within a wireless communication system. With respect to this exemplary TDMA termination embodiment, a manager/coordinator wireless communication device, such as in AP, maybe implemented to detect IDLE duration>(CWMAX+1) *SLOTTIME+AIFS during an SP that is for STA of class L. In response to this, the manager/coordinator wireless communication device may be implemented to send permission to the other wireless communication devices within the system to use remainder of SP to STAs of class M. Alternatively, the manager/coordinator wireless communication device may be implemented to send permission to all classes or to an individual STA, etc. The class M wireless communication devices (e.g., STAs) begin to use leftover class L SP time.

Also, within certain embodiments, operations may be effectuated using a subset of PHY preambles in some SPs. For example, there may be different preambles used for different use-cases in accordance with various applications, including those operating in compliance with the currently developing IEEE 802.11 ah standard. For example, different respective preamble types may be employed including long-range preamble as compared to normal range preamble. Alternatively, other variations of different respective preamble types may include those related towards multi-user (MU) applications and those related towards single-user (SU) applications. Generally speaking, there may be some situations in which there is variability among the respective preamble types employed as specifically tailored to different respective wireless communication devices. The use of a specific SP or SPs may be used to restrict the type of PHY preambles that are used to transmit packets in the SP in order to effectuate any of a number of considerations.

For example, with respect to reducing overhead, the specification or restriction of a specific SP or SPs may be employed by avoiding the necessity of having a combined header that is receivable by those wireless communication devices (e.g., STAs) with different receiver capabilities (with respect to receiving preambles).

With respect to reducing the complexity of those wireless communication devices (e.g., STAs), those respective wireless communication devices may be implemented to be relatively simpler because they do not have to implement capability to receive all possible and variant preamble types.

With respect to reducing power consumption of those wireless communication devices (e.g., STAs), those respective wireless communication devices that are implemented and do have the capability of multiple preamble processing can disable processing for those particular preambles not allowed in an SP in order to save power. For example, such a given wireless communication devices may be limited to operate in accordance with a reduced or less than full functionality set.

FIG. 24, FIG. 25, FIG. 26, FIG. 27, and FIG. 28 illustrate various embodiments of methods performed by one or more communication devices.

Figure 24:
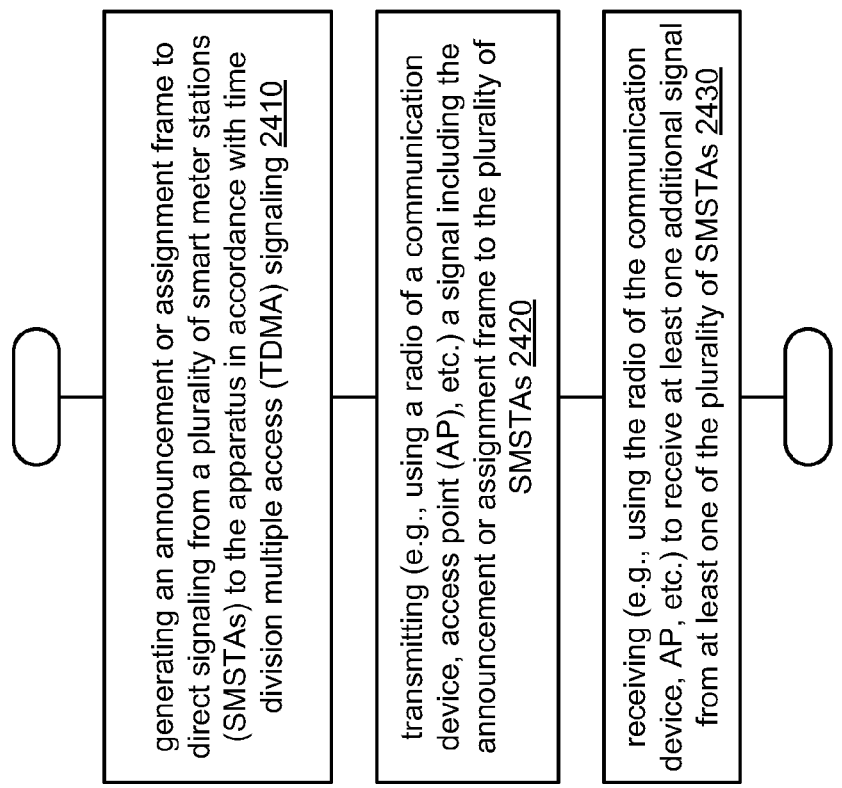

Referring to method 2400 of FIG. 24, the method 2400 begins by generating an announcement or assignment frame to direct signaling from a plurality of smart meter stations (SMSTAs) to the apparatus in accordance with time division multiple access (TDMA) signaling, as shown in a block 2410. The method 2400 continues by transmitting (e.g., using a radio of a communication device, access point (AP), etc.) a signal including the announcement or assignment frame to the plurality of SMSTAs, as shown in a block 2420.

The method 2400 then operates by receiving (e.g., using the radio of the communication device, AP, etc.) to receive at least one additional signal from at least one of the plurality of SMSTAs, as shown in a block 2430.

Referring to method 2500 of FIG. 25, the method 2500 begins by transmitting (e.g., using a radio of a communication device, access point (AP), etc.) a first signal including a first announcement or assignment frame to a first group of SMSTAs, as shown in a block 2510. The method 2500 continues by supporting communications (e.g., uplink and/or downlink) between the communication device and at least one of the first group of SMSTAs based on the first announcement or assignment frame, as shown in a block 2520.

The method 2500 then operates by transmitting (e.g., using the radio of the communication device, AP, etc.) a second signal including a second announcement or assignment frame to a second group of SMSTAs (may include at least one SMSTA of the first group of SMSTAs), as shown in a block 2530. The method 2500 continues by supporting communications (e.g., uplink and/or downlink) between the communication device and at least one of the second group of SMSTAs based on the second announcement or assignment frame, as shown in a block 2540.

Referring to method 2600 of FIG. 26, the method 2600 begins by transmitting (e.g., using a radio of a communication device, AP, etc.) a signal including a first announcement or assignment frame indicating a number of service periods (SPs) to a group of SMSTAs, as shown in a block 2610. During a first SP, the method 2600 continues by supporting communications (e.g., uplink and/or downlink) between the communication device and a first at least one of the SMSTAs, as shown in a block 2620.

During a second SP, the method 2600 then operates by supporting communications (e.g., uplink and/or downlink) between the communication device and a second at least one SMSTA (may include at least one SMSTA operative during the first SP), as shown in a block 2630.

In some embodiments, even more SPs may be employed. For example, in some instances, during an n-th SP, the method 2600 continues by supporting communications (e.g., uplink and/or downlink) between the communication device and an n-th at least one SMSTA (may include at least one SMSTA operative during the first and/or second SP), as shown in a block 2640.

Referring to method 2700 of FIG. 27, the method 2700 begins by transmitting (e.g., using a radio of a communication device, AP, etc.) a signal including a first announcement or assignment frame indicating a number of service periods (SPs) to a group of SMSTAs, as shown in a block 2710. The method 2700 continues, during a first SP, such that a first at least one of the SMSTAs making communication media access in accordance with a first operational mode for supporting communications with the communication device (e.g., uplink and/or downlink), as shown in a block 2720.

The method 2700 then operates, during a second SP, such that a second at least one of the SMSTAs making communication media access in accordance with a second operational mode (and/or or the first operational mode) for supporting communications with the communication device (e.g., uplink and/or downlink), as shown in a block 2730.

In some embodiments, even more SPs may be employed. For example, in some instances, the method 2700 continues, during an n-th SP, such that an n-th at least one of the SMSTAs making communication media access in accordance with an n-th operational mode (and/or or the first or second operational mode) for supporting communications with the communication device (e.g., uplink and/or downlink), as shown in a block 2740.

Figure 28:
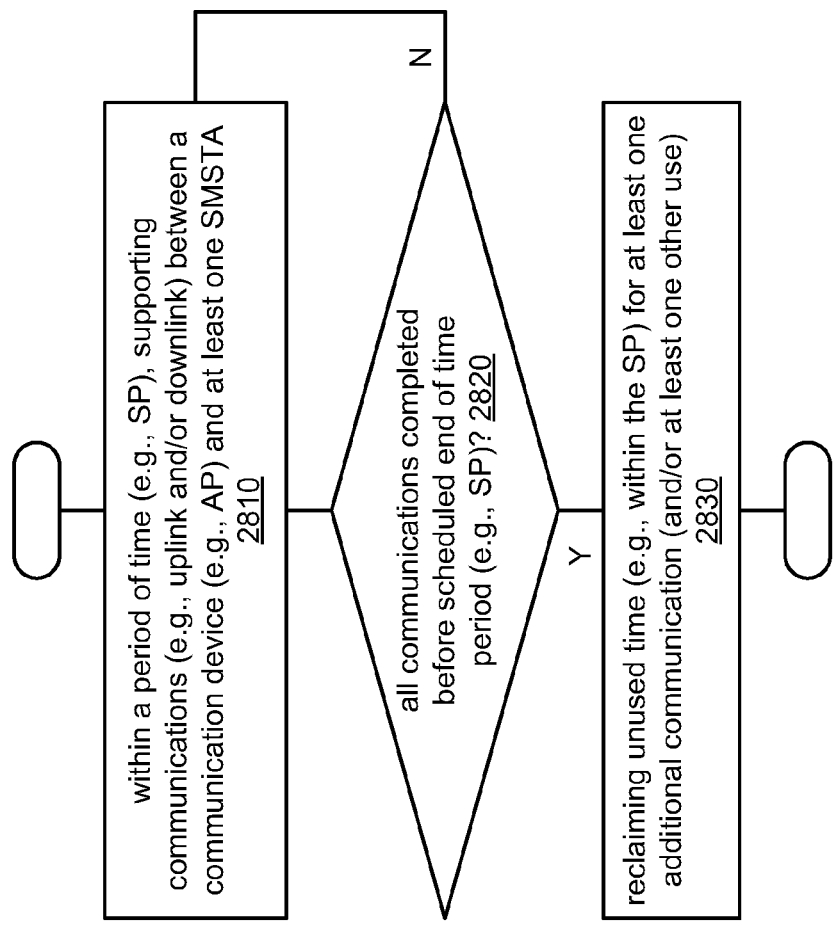

Referring to method 2800 of FIG. 28, within a period of time (e.g., SP), the method 2800 begins by supporting communications (e.g., uplink and/or downlink) between a communication device (e.g., AP) and at least one SMSTA, as shown in a block 2810. The method 2800 continues by determining whether or not all communications completed before scheduled end of time period (e.g., SP), as shown in a decision block 2820.

If it is determined that one or more communications need to be performed before the scheduled end of time period (e.g., before the end of an SP), then the method 2800 continues performing the operations such as described with reference to block 2810.

However, if it is determined that all communications are in fact completed or performed before the scheduled end of time period (e.g., before the end of an SP), then the method 2800 operates by reclaiming unused time (e.g., within the SP) for at least one additional communication (and/or at least one other use), as shown in a block 2830.

It is also noted that the various operations and functions as described with respect to various methods herein may be performed within a wireless communication device, such as using a baseband processing module and/or a processing module implemented therein, (e.g., such as in accordance with the baseband processing module 64 and/or the processing module 50 as described with reference to FIG. 2) and/or other components therein. For example, such a baseband processing module can generate such signals and frames as described herein as well as perform various operations and analyses as described herein, or any other operations and functions as described herein, etc. or their respective equivalents.

In some embodiments, such a baseband processing module and/or a processing module (which may be implemented in the same device or separate devices) can perform such processing to generate signals for transmission using at least one of any number of radios and at least one of any number of antennae to another wireless communication device (e.g., which also may include at least one of any number of radios and at least one of any number of antennae) in accordance with various aspects of the invention, and/or any other operations and functions as described herein, etc. or their respective equivalents. In some embodiments, such processing is performed cooperatively by a processing module in a first device, and a baseband processing module within a second device. In other embodiments, such processing is performed wholly by a baseband processing module or a processing module.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

Mode Selection Tables:

TABLE 1

| | | | | | | | | | |
|---|---|---|---|---|---|---|---|---|---|
| 2.4 GHz, 20/22 MHz channel BW, 54 Mbps max bit rate | | | | | | | | | |
| Rate | Modulation | Code Rate | NBPSC | NCBPS | NDBPS | EVM | Sensitivity | ACR | AACR |
| | Barker | | | | | | | | |
| 1 | BPSK | | | | | | | | |
| | Barker | | | | | | | | |
| 2 | QPSK | | | | | | | | |
| 5.5 | CCK | | | | | | | | |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 11 | CCK | | | | | | | | |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 2

Channelization for Table 1

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 3

Power Spectral Density (PSD) Mask for Table 1
PSD Mask 1

| Frequency Offset | dBr |
|---|---|
| −9 MHz to 9 MHz | 0 |
| +/−11 MHz | −20 |
| +/−20 MHz | −28 |
| +/−30 MHz and greater | −50 |

TABLE 4

5 GHz, 20 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 5

Channelization for Table 4

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 6

2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |
| 3 | 2422 |

TABLE 7-continued

Channelization for Table 6

| Channel | Frequency (MHz) |
|---|---|
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 8

5 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 10

5 GHz, with 40 MHz channels and max bit rate of 486 Mbps

| Rate | TX Antennas | ST Code Rate | Modulation | Code Rate | NBPSC |
|---|---|---|---|---|---|
| 13.5 Mbps | 1 | 1 | BPSK | 0.5 | 1 |
| 27 Mbps | 1 | 1 | QPSK | 0.5 | 2 |
| 54 Mbps | 1 | 1 | 16-QAM | 0.5 | 4 |
| 108 Mbps | 1 | 1 | 64-QAM | 0.666 | 6 |
| 121.5 Mbps | 1 | 1 | 64-QAM | 0.75 | 6 |
| 27 Mbps | 2 | 1 | BPSK | 0.5 | 1 |
| 54 Mbps | 2 | 1 | QPSK | 0.5 | 2 |
| 108 Mbps | 2 | 1 | 16-QAM | 0.5 | 4 |
| 216 Mbps | 2 | 1 | 64-QAM | 0.666 | 6 |
| 243 Mbps | 2 | 1 | 64-QAM | 0.75 | 6 |
| 40.5 Mbps | 3 | 1 | BPSK | 0.5 | 1 |
| 81 Mbps | 3 | 1 | QPSK | 0.5 | 2 |
| 162 Mbps | 3 | 1 | 16-QAM | 0.5 | 4 |
| 324 Mbps | 3 | 1 | 64-QAM | 0.666 | 6 |
| 365.5 Mbps | 3 | 1 | 64-QAM | 0.75 | 6 |
| 54 Mbps | 4 | 1 | BPSK | 0.5 | 1 |
| 108 Mbps | 4 | 1 | QPSK | 0.5 | 2 |
| 216 Mbps | 4 | 1 | 16-QAM | 0.5 | 4 |
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10
PSD Mask 2

| Frequency Offset | dBr |
|---|---|
| −19 MHz to 19 MHz | 0 |
| +/−21 MHz | −20 |
| +/−30 MHz | −28 |
| +/−40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |
| 151 | 5755 | USA | | | |
| 159 | 5795 | USA | | | |

What is claimed is:

1. A wireless communication device comprising:
a communication interface; and
a processor configured to:
  generate an announcement or assignment frame to direct a plurality of smart meter stations (SMSTAs) to transmit to the wireless communication device based on time division multiple access (TDMA) signaling, wherein the announcement or assignment frame includes information that partitions the plurality of SMSTAs into a plurality of groups and to assign a plurality of service periods (SPs) of the TDMA signaling respectively for the plurality of groups to transmit to the wireless communication device, wherein a SMSTA of the plurality of SMSTAs is configured to:
    awaken from the power savings mode to an operational mode and subsequently to re-enter the power savings mode including to operate within the operational mode less than a tenth of percentage of period of time than the SMSTA is configured to operate within the power savings mode;
    generate sensing or measurement related data when operating in the operational mode; and
    transmit the sensing or measurement related data when operating in the operational mode and during at least one SP of the plurality of SPs that is assigned to a group of the plurality of groups that includes the SMSTA;
  transmit, via the communication interface, the announcement or assignment frame to the plurality of SMSTAs;
  receive, via the communication interface, first sensing or measurement related data from the SMSTA during a first SP of the plurality of SPs; and
  receive, via the communication interface, second sensing or measurement related data from another SMSTA that is included within another group the plurality of groups during a second SP of the plurality of SPs.

2. The wireless communication device of claim 1, wherein the processor is further configured to generate the announcement or assignment frame to direct:
  communication medium access for the SMSTA based on a first operational mode at or during a first time based on the TDMA signaling; and
  communication medium access for the other SMSTA based on a second operational mode at or during a second time based on the TDMA signaling.

3. The wireless communication device of claim 2, wherein at least one of the first operational mode or the second operational mode being enhanced distributed channel access (EDCA), polled, scheduled, or carrier sense multiple access/collision avoidance (CSMA/CA).

4. The wireless communication device of claim 1, wherein the SMSTA is included within each of a first group of the plurality of groups and a second group of the plurality of groups.

5. The wireless communication device of claim 1 further comprising:
  an access point (AP) configured to support communications with the plurality of SMSTAs and also with at least one wireless station (STA).

6. A wireless communication device comprising:
a communication interface; and
a processor configured to:
  generate an announcement or assignment frame to direct a plurality of smart meter stations (SMSTAs) to transmit to the wireless communication device based on time division multiple access (TDMA) signaling, wherein a SMSTA of the plurality of SMSTAs is configured to awaken from the power savings mode to an operational mode and subsequently to re-enter the power savings mode including to operate within the operational mode less than a tenth of percentage of period of time than the SMSTA is configured to operate within the power savings mode, and to generate sensing or measurement related data when operating in the operational mode; and
  transmit, via the communication interface, the announcement or assignment frame to the plurality of SMSTAs; and
  receive, via the communication interface, the sensing or measurement related data generated by the SMSTA when the SMSTA is operating in the operational mode and during at least one SP of the plurality of SPs that is assigned to the SMSTA.

7. The apparatus of claim 6, wherein the processor is further configured to:
  receive, via the communication interface, first sensing or measurement related data from the SMSTA during a first TDMA time period; and
  receive, via the communication interface, second sensing or measurement related data from the SMSTA during a second TDMA time period.

8. The wireless communication device of claim 6, wherein the processor is further configured to:
  generate the announcement or assignment frame to include information that partitions the plurality of SMSTAs into a plurality of groups, wherein:
  the information also specifies communication medium access to at least one SMSTA of a first group of the plurality of groups in accordance with a first operational mode at or during a first time based on the TDMA signaling; and
  the information also specifies communication medium access to at least one SMSTA of a second group of the plurality of groups in accordance with a second operational mode at or during a second time based on the TDMA signaling.

9. The wireless communication device of claim 8, wherein at least one of the first operational mode or the second operational mode being enhanced distributed channel access (EDCA), polled, scheduled, or carrier sense multiple access/collision avoidance (CSMA/CA).

10. The wireless communication device of claim 6, wherein the processor is further configured to:
  generate the announcement or assignment frame to include information that partitions the plurality of SMSTAs into a plurality of groups and that indicates a plurality of service periods (SPs) during which the plurality of groups respectively have communication medium access to transmit at least one of sensing and measurement related data to the wireless communication device, wherein:
  the information also specifies a first group of the plurality of groups to have communication medium access during a first SP of the plurality of SPs; and
  the information also specifies a second group of the plurality of groups to have communication medium access during a second SP of the plurality of SPs.

11. The wireless communication device of claim 6, wherein the processor is further configured to:
  generate the announcement or assignment frame to include information to indicate a first at least one service period (SP) during which at least one of the plurality of SMS-TAs has communication medium access; and generate at least one additional announcement or assignment frame, based on at least one of prior history, operations, or environmental conditions associated with the first at least one SP, indicating a second at least one SP during which the at least one of the plurality of SMSTAs or at least one additional of the plurality of SMSTAs to have communication medium access.

12. The wireless communication device of claim 6, wherein the processor is further configured to:
generate the announcement or assignment frame to include information that partitions the plurality of SMSTAs into a plurality of groups; and
at least one of the plurality of SMSTAs included within each of a first of the plurality of groups and a second of the plurality of groups.

13. The wireless communication device of claim 6 further comprising:
an access point (AP) configured to support communications with the plurality of SMSTAs and also with at least one wireless station (STA).

14. A method execution by a wireless communication device, the method comprising:
generating an announcement or assignment frame to direct a plurality of smart meter stations (SMSTAs) to transmit to the wireless communication device based on time division multiple access (TDMA) signaling, wherein a SMSTA of the plurality of SMSTAs is configured to awaken from the power savings mode to an operational mode and subsequently to re-enter the power savings mode including to operate within the operational mode less than a tenth of percentage of period of time than the SMSTA is configured to operate within the power savings mode, and to generate sensing or measurement related data when operating in the operational mode;
transmitting, via a communication interface of the wireless communication device, the announcement or assignment frame to the plurality of SMSTAs; and
receiving, via the communication interface, the sensing or measurement related data generated by the SMSTA when the SMSTA is operating in the operational mode and during at least one SP of the plurality of SPs that is assigned to the SMSTA.

15. The method of claim 14 further comprising:
receiving, via the communication interface, first sensing or measurement related data from the SMSTA during a first TDMA time period; and
receiving, via the communication interface, second sensing or measurement related data from the SMSTA during a second TDMA time period.

16. The method of claim 14 further comprising:
generating the announcement or assignment frame to include information that partitions the plurality of SMS-TAs into a plurality of groups, wherein:

the information also specifies communication medium access to at least one SMSTA of a first group of the plurality of groups to operate based on a first operational mode at or during a first time based on the TDMA signaling; and
the information also specifies communication medium access to at least one SMSTA of a second group of the plurality of groups to operate based on a second operational mode at or during a second time based on the TDMA signaling, wherein at least one of the first operational mode and the second operational mode being enhanced distributed channel access (EDCA), polled, scheduled, or carrier sense multiple access/collision avoidance (CSMA/CA).

17. The method of claim 14 further comprising:
generating the announcement or assignment frame to include information that partitions the plurality of SMS-TAs into a plurality of groups and that indicates a plurality of service periods (SPs) during which the plurality of groups respectively have communication medium access to transmit at least one of sensing and measurement related data to the wireless communication device, wherein:
the information also specifies a first group of the plurality of groups to have communication medium access during a first SP of the plurality of SPs; and
the information also specifies a second group of the plurality of groups to have communication medium access during a second SP of the plurality of SPs.

18. The method of claim 14 further comprising:
generating the announcement or assignment to include information to include a first at least one service period (SP) during which at least one of the plurality of SMS-TAs has communication medium access; and
generating at least one additional announcement or assignment frame, based on at least one of prior history, operations, or environmental conditions associated with the first at least one SP, indicating a second at least one SP during which the at least one of the plurality of SMSTAs or at least one additional of the plurality of SMSTAs to have communication medium access.

19. The method of claim 14 further comprising:
generating the announcement or assignment frame to include information that partitions the plurality of SMS-TAs into a plurality of groups, wherein at least one of the plurality of SMSTAs included within each of a first group of the plurality of groups and a second group of the plurality of groups.

20. The method of claim 14, wherein the communication device is an access point (AP) that is configured to support communications with the plurality of SMSTAs and also with at least one wireless station (STA).

* * * * *